(12) United States Patent
Teyeb et al.

(10) Patent No.: US 10,321,382 B2
(45) Date of Patent: Jun. 11, 2019

(54) MOBILITY AND/OR ACCESS SELECTION BETWEEN CELLS

(71) Applicant: Telefonaktiebolaget LM Ericsson (publ), Stockholm OT (SE)

(72) Inventors: Oumer Teyeb, Stockholm (SE); Mattias Tan Bergström, Stockholm (SE); Angelo Centonza, Winchester (GB); Christofer Lindheimer, Kista (SE); Filip Mestanov, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 11 days.

(21) Appl. No.: 15/462,479

(22) Filed: Mar. 17, 2017

(65) Prior Publication Data
US 2017/0257816 A1 Sep. 7, 2017

Related U.S. Application Data

(63) Continuation of application No. 14/408,479, filed as application No. PCT/SE2014/051142 on Oct. 16, 2014.
(Continued)

(51) Int. Cl.
*H04W 48/04* (2009.01)
*H04W 36/00* (2009.01)
(Continued)

(52) U.S. Cl.
CPC .......... *H04W 48/04* (2013.01); *H04W 28/08* (2013.01); *H04W 36/0016* (2013.01);
(Continued)

(58) Field of Classification Search
CPC .. H04W 36/00; H04W 36/0022; H04W 48/04
(Continued)

(56) References Cited

U.S. PATENT DOCUMENTS 8,787,159 B2 * 7/2014 Barclay ................. H04L 47/245
370/229
2013/0183960 A1 7/2013 Olofsson et al.
(Continued)

FOREIGN PATENT DOCUMENTS

EP 2720508 A1 4/2014
JP 2009544210 A 12/2009
(Continued)

OTHER PUBLICATIONS

3GPP, "3rd Generation Partnership Project; Technical Specification Group Radio Access Network; Radio Resource Control (RRC); Protocol specification (Release 12)", 3GPP TS 25.331 V12.2.0, Jun. 2014, 1-2140.
(Continued)

*Primary Examiner* — Kamran Afshar
*Assistant Examiner* — Farideh Madani
(74) *Attorney, Agent, or Firm* — Murphy, Bilak & Homiller, PLLC

(57) ABSTRACT

There is provided a method, performed by a network node, for steering of access between cells. The method comprises receiving, from user equipment, a report indicating failure to access a cell, also referred to as a rejecting cell, due to internal reasons of another network node, also referred to as a rejecting network node, serving the rejecting cell. The method also comprises steering the access of the user equipment between cells by modifying at least one offloading parameter and/or threshold based on the report indicating failure to access the rejecting cell due to internal reasons of the rejecting network node serving the rejecting cell. With this new type of report the network can modify offloading parameter(s) and/or threshold(s) in a more suitable way since the network has more information available.

14 Claims, 20 Drawing Sheets

Related U.S. Application Data

(60) Provisional application No. 61/946,942, filed on Mar. 3, 2014.

(51) Int. Cl.

| | | |
|---|---|---|
| *H04W 28/08* | (2009.01) | |
| *H04W 88/06* | (2009.01) | |
| *H04W 88/10* | (2009.01) | |
| *H04W 36/22* | (2009.01) | |
| *H04W 36/14* | (2009.01) | |
| *H04W 48/02* | (2009.01) | |
| *H04W 48/14* | (2009.01) | |
| *H04W 76/18* | (2018.01) | |

(52) U.S. Cl.
CPC ... *H04W 36/0022* (2013.01); *H04W 36/0083* (2013.01); *H04W 36/14* (2013.01); *H04W 36/22* (2013.01); *H04W 48/02* (2013.01); *H04W 48/14* (2013.01); *H04W 76/18* (2018.02); *H04W 88/06* (2013.01); *H04W 88/10* (2013.01)

(58) Field of Classification Search
USPC ............. 455/452.1, 452.2, 453, 451
See application file for complete search history.

(56) References Cited

U.S. PATENT DOCUMENTS

| | | | |
|---|---|---|---|
| 2013/0212228 A1 | 8/2013 | Butler et al. | |
| 2013/0232555 A1* | 9/2013 | Zhang | H04W 12/08 726/4 |
| 2014/0313907 A1 | 10/2014 | Wang et al. | |
| 2014/0348131 A1* | 11/2014 | Duan | H04W 36/30 370/331 |
| 2015/0223113 A1* | 8/2015 | Matsunaga | H04W 48/06 370/236 |
| 2015/0237516 A1 | 8/2015 | Michel | |

FOREIGN PATENT DOCUMENTS

| | | | | |
|---|---|---|---|---|
| JP | 2013535904 A | 9/2013 | | |
| RU | 2447618 C2 | 4/2012 | | |
| WO | 2012019363 A1 | 2/2012 | | |
| WO | 2012142437 A1 | 10/2012 | | |
| WO | 2013071856 A1 | 5/2013 | | |
| WO | 2013091161 A1 | 6/2013 | | |
| WO | 2013107046 A1 | 7/2013 | | |
| WO | 2013113357 A1 | 8/2013 | | |
| WO | WO-2013113357 A1 * | 8/2013 | ............ | H04W 24/04 |
| WO | 2014005247 A1 | 1/2014 | | |
| WO | 2014026714 A1 | 2/2014 | | |

OTHER PUBLICATIONS

3GPP, "3rd Generation Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); St", 3GPP TR 23.852 V12.0.0, Sep. 2013, 1-157.

3GPP, "3rd Generation Partnership Project; Technical Specification Group Services and System Aspects; Study on Wireless Local Area Network (WLAN) network selection for 3GPP terminals; Stage 2 (Release 12)", 3GPP TR 23.865 V12.1.0, Dec. 2013, 1-44.

ETSI, "LTE; Evolved Universal Terrestrial Radio Access (E-UTRA); Radio Resource Control (RRC); Protocol specification", ETSI TS 136 331 V12.3.0 (3GPP TS 36.331 version 12.3.0 Release 12), Sep. 2014, 1-383.

ETSI, "LTE; Evolved Universal Terrestrial Radio Access (E-UTRA); User Equipment (UE) procedures in idle mode", ETSI TS 136 304 V12.2.0 (3GPP TS 36.304 version 12.2.0 Release 12), Sep. 2014, 1-39.

ETSI, "LTE; Evolved Universal Terrestrial Radio Access Network (E-UTRAN); S1 Application Protocol (S1AP)", ETSI TS 136 413 V12.3.0 (3GPP TS 36.413 version 12.3.0 Release 12), Sep. 2014, 1-296.

ETSI, "Universal Mobile Telecommunications System (UMTS); Access Network Discovery and Selection Function (ANDSF) Management Object (MO)", ETSI TS 124 312 V12.6.1 (3GPP TS 24.312 version 12.6.1 Release 12), Oct. 2014, 1-356.

ETSI, "Universal Mobile Telecommunications System (UMTS); LTE; Access to the 3GPP Evolved Packet Core (EPC) via non-3GPP access networks; Stage 3", ETSI TS 124 302 (3GPP TS 24.302 version 12.6.0 Release 12), Oct. 2014, 1-100.

ETSI, "Universal Mobile Telecommunications System (UMTS); LTE; Architecture enhancements for non-3GPP accesses", ETSI TS 123 402 V12.6.0 (3GPP TS 23.402 version 12.6.0 Release 12), Sep. 2014, 1-290.

ETSI, "Universal Mobile Telecommunications System (UMTS); User Equipment (UE) procedures in idle mode and procedures for cell reselection in connected mode", ETSI TS 125 304 V12.3.0 (3GPP TS 25.304 version 12.3.0 Release 12), Sep. 2014, 1-60.

Unknown, Author, "3rd Generation Partnership Project; Technical Specification Group Radio Access Network; Study on WLAN/3GPP Radio Interworking (Release 12)", R2-132240, 3GPP TR 37.834 V0.2.1, May 2013, 1-15.

Unknown, Author, "IRAT MRO way forward", 3GPP TSG-RAN WG3 Meeting #75, R3-120390, Huawei, Dresden, Germany, Feb. 6-10, 2012, 1-3.

Unknown, Author, "IRAT too late", 3GPP TSG RAN WG3 Meeting #69bis, R3-102713, Huawei, Oct. 11-15, 2010, 1-4.

Unknown, Author, "New Study Item Proposal on WLAN/3GPP Radio Interworking", 3GPP TSG-RAN Meeting #58, RP-122038, Intel Corporation, Barcelona, Spain, Dec. 4-7, 2012, 1-6.

Unknown, Author, "New Work Item Proposal: WLAN/3GPP Radio Interworking (Core)", 3GPP TSG|WG-RAN Meeting #62, RP-132101, Intel Corporation, Korea, Busan, Dec. 3-6, 2013, 1-7.

Unknown, Author, "New Work Item Proposal: WLAN/3GPP Radio Interworking (Feature)", 3GPP TSG|WG-RAN Meeting #62, RP-132101, Intel Corporation, Korea, Busan, Dec. 3-6, 2013, 1-6.

Unknown, Author, "Self-Optimizing Networks in 3GPP Release11: The Benefits of SON in LTE", 4G Americas, Oct. 2013, 1-62.

\* cited by examiner

MOBILITY AND/OR ACCESS SELECTION BETWEEN CELLS

RELATED APPLICATIONS

This application is a Continuation of U.S. application Ser. No. 14/408,479 filed Dec. 16, 2014, which is a US National Phase Application of PCT/SE2014/051142 filed Oct. 16, 2014, which claims priority to U.S. Provisional Application No. 61/946,942 filed Mar. 3, 2014.

TECHNICAL FIELD

The proposed technology generally relates to mobility and/or access selection between cells of different radio access networks or between different cells of the same radio access network. More specifically, the proposed technology relates to a method for enabling steering of access between cells, and a method for steering of access between cells, as well as a corresponding user equipment and network node, and corresponding computer programs and computer program products.

BACKGROUND

An important aspect of wireless or radio communications technology relates to mobility and/or access selection between cells of different radio access networks or between different cells of the same radio access network. When considering different radio access networks, the source cell and the target cell may belong to radio access networks of different radio access technologies such as a cellular network and a Wireless Local Area Network, WLAN.

Communication devices such as terminals are also known as e.g. User Equipments (UE), mobile terminals, wireless terminals and/or mobile stations. Terminals are enabled to communicate wirelessly in a cellular communications network or wireless communication system, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within and/or connected to the cellular communications network.

Examples of wireless communication systems are Long Term Evolution (LTE), Universal Mobile Telecommunications System (UMTS) and Global System for Mobile communications (GSM).

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

By way of example, in 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission in LTE is controlled by the radio base station.

As an example, Wi-Fi and similar WLAN technologies have been subject to increased interest from cellular network operators, not only as an extension to fixed broadband access. The interest is mainly about using the Wi-Fi technology as an extension, or alternative to cellular radio access network technologies to handle the always increasing wireless bandwidth demands. Cellular operators that are currently serving mobile users with, e.g., any of the 3GPP technologies, LTE, UMTS/WCDMA, or GSM, see Wi-Fi as a wireless technology that may provide good support in their regular cellular networks. The term "operator-controlled Wi-Fi" points to a Wi-Fi deployment that on some level is integrated with a cellular network operator's existing network and where the 3GPP radio access networks and the Wi-Fi wireless access may even be connected to the same core network and provide the same services.

There is currently some activity in the area of operator-controlled Wi-Fi in several standardization organizations. In 3GPP, activities to connect Wi-Fi access points to the 3GPP-specified core network is pursued, and in Wi-Fi Alliance (WFA) activities related to certification of Wi-Fi products are undertaken, which to some extent also is driven from the need to make Wi-Fi a viable wireless technology for cellular operators to support high bandwidth offerings in their networks. The term Wi-Fi offload is commonly used and points towards the situation that cellular network operators seek means to offload traffic from their cellular networks to Wi-Fi, e.g., in peak-traffic-hours and in situations when the cellular network for one reason or another needs to be off-loaded, e.g., to provide requested quality of service, maximize bandwidth or simply for coverage.

Most current Wi-Fi and current other Wireless Local Area Network (WLAN) deployments are totally separate from mobile networks, and may be seen as non-integrated from the terminal perspective. Most Operating Systems (OS) for UEs, such as Android™ and ioS®, support a simple Wi-Fi offloading mechanism where a UE immediately switches all its IP traffic to a Wi-Fi network upon a detection of a suitable network with a received signal strength above a certain level. Henceforth, the decision to offload to a Wi-Fi or not is referred to as access selection strategy and the term "Wi-Fi-if-coverage" is used to refer to the aforementioned strategy of selecting Wi-Fi whenever such a network is detected.

A problem is that a UE with a mobility policy implying offloading to a cell in another radio access network, or to a cell of the same radio access network may be "ping-ponged"

back and forth between cells. This so-called ping-pong effect results in degraded performance of the UE and of the involved radio access network(s). For example, the ping-ponging may result in service interruptions as well as generate considerable unnecessary signalling.

SUMMARY

It is a general object to provide support for and/or improve the steering of access between cells.

In particular it is desirable to provide support for and/or improve the off-loading between different cells.

It is an object to provide a method, performed by user equipment, for enabling steering of access between cells.

It is also an object to provide a method, performed by a network node, for steering of access between cells.

It is another object to provide a user equipment configured to enable steering of access between cells.

Yet another object is to provide a network node configured to steer access between cells.

Still another object is to provide corresponding computer programs and computer program products.

It is also an object to provide a user equipment for enabling steering of access between network nodes.

It is an object to provide a network node for steering of access of user equipment between network nodes.

Yet another object is to provide a network node configured for operation in a radio access network.

These and other objects are met by embodiments of the proposed technology.

According to a first aspect, there is provided a method, performed by user equipment, for enabling steering of access between cells. The method comprises the step of receiving an indication of rejection to access a cell, also referred to as a rejecting cell, due to internal reasons, independent of radio channel conditions, of a network node serving the rejecting cell. The method also comprises the step of sending to another network node serving an available cell, different from the rejecting cell, a report indicating failure to access the rejecting cell due to internal reasons, independent of radio channel conditions, of the network node serving the rejecting cell.

According to a second aspect, there is provided a method, performed by a network node, for steering of access between cells. The method comprises the step of receiving, from user equipment, a report indicating failure to access a cell, also referred to as a rejecting cell, due to internal reasons, independent of radio channel conditions, of another network node, also referred to as a rejecting network node, serving the rejecting cell. The method also comprises the step of steering the access of the user equipment between cells by modifying at least one offloading parameter and/or threshold based on the report indicating failure to access the rejecting cell due to internal reasons of the rejecting network node serving the rejecting cell.

According to a third aspect, there is provided a user equipment configured to enable steering of access between cells. The user equipment is configured to receive an indication of rejection to access a cell, also referred to as a rejecting cell, due to internal reasons, independent of radio channel conditions, of a network node serving the rejecting cell. The user equipment is configured to send to another network node serving an available cell, different from the rejecting cell, a report indicating failure to access the rejecting cell due to internal reasons, independent of radio channel conditions, of the network node serving the rejecting cell.

According to a fourth aspect, there is provided a network node configured to steer access between cells. The network node is configured to receive, from user equipment, a report indicating failure to access a cell, also referred to as a rejecting cell, due to internal reasons, independent of radio channel conditions, of another network node, also referred to as a rejecting network node, serving the rejecting cell. The network node is configured to modify at least one offloading parameter and/or threshold used for steering the access of the user equipment between cells based on the report indicating failure to access the rejecting cell due to internal reasons of the rejecting network node serving the rejecting cell.

According to a fifth aspect, there is provided a computer program comprising instructions, which when executed by at least one processor, cause the at least one processor to:
receive an indication of rejection to access a cell, also referred to as a rejecting cell, due to internal reasons, independent of radio channel conditions, of a network node serving the rejecting cell; and
send a report, for another network node serving an available cell, different from the rejecting cell, wherein the report indicates failure to access the rejecting cell due to internal reasons, independent of radio channel conditions, of the network node serving the rejecting cell.

According to a sixth aspect, there is provided a computer program comprising instructions, which when executed by at least one processor, cause the at least one processor to:
receive a report, originating from user equipment, indicating failure to access a cell, also referred to as a rejecting cell, due to internal reasons, independent of radio channel conditions, of another network node, also referred to as a rejecting network node, serving the rejecting cell; and
modify at least one offloading parameter and/or threshold used for steering the access of the user equipment between cells based on the report indicating failure to access the rejecting cell due to internal reasons of the rejecting network node serving the rejecting cell.

According to a seventh aspect, there is provided a computer program product comprising a computer-readable storage medium having stored thereon the computer program of the above fifth or sixth aspect.

According to an eighth aspect, there is provided a user equipment for enabling steering of access between network nodes. The user equipment comprises a receiving module for receiving an indication of rejection to access a cell, also referred to as a rejecting cell, due to internal reasons, independent of radio channel conditions, of a network node serving the rejecting cell. The user equipment also comprises a producing module for producing a report indicating failure to access the rejecting cell due to internal reasons, independent of radio channel conditions, of the network node serving the rejecting cell. The user equipment further comprises a sending module for sending the report indicating failure to access the rejecting cell to another network node serving an available cell, different from the rejecting cell.

According to a ninth aspect, there is provided a network node for steering of access of user equipment between network nodes. The network node comprises a receiving module for receiving a report, originating from user equipment, indicating failure to access a cell, also referred to as a rejecting cell, due to internal reasons, independent of radio channel conditions, of another network node, also referred to as a rejecting network node, serving the rejecting cell. The network node also comprises a modifying module for modifying at least one offloading parameter and/or threshold used for steering the access of the user equipment between cells of different network nodes based on the report indicating failure to access the rejecting cell due to internal reasons of the rejecting network node serving the rejecting cell.

According to a tenth aspect, there is provided a network node configured for operation in a radio access network. The network node is configured to reject a user equipment access to a cell, also referred to as a rejecting cell, due to internal reasons, independent of radio channel conditions, of the network node. The network node is also configured to send to the user equipment an indication of rejection to access the rejecting cell due to internal reasons, independent of radio channel conditions, of the network node.

In this way, it is possible to support and/or improve the steering of access between cells.

Other advantages will be appreciated when reading the detailed description.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Figure 1:
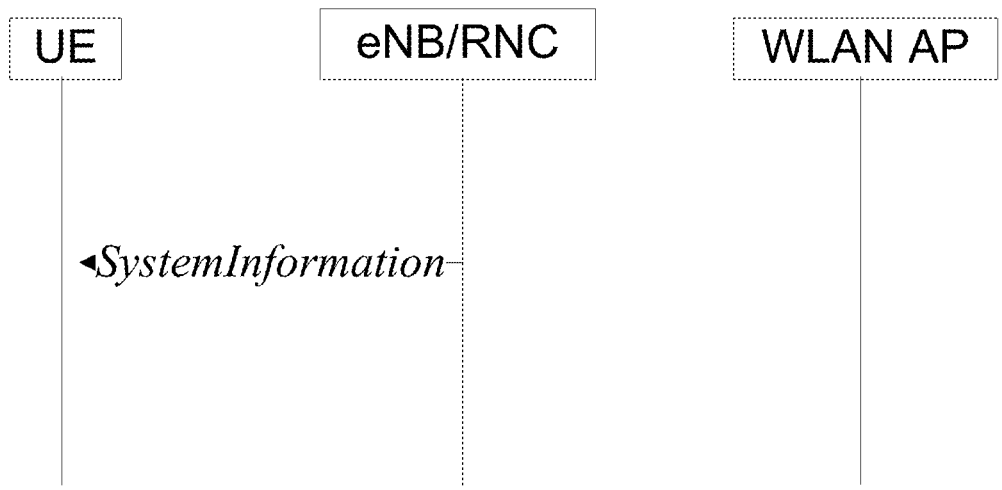
FIG. 1-3 are schematic diagrams illustrating different examples of WLAN and 3GPP interworking at RAN level.

Throughout the drawings, the same reference designations are used for similar or corresponding elements.

Embodiments herein address the issue of mobility and access selection between cells of different radio access networks and/or between different cells of the same radio access network. Specifically, embodiments herein address mobility and access selection between radio access networks of different access technologies, such as between a 3GPP cellular RAN and a WLAN. For example, embodiments herein address the problem of ping-ponging between a 3GPP RAN and a WLAN due to unmatched offloading parameters and/or thresholds and/or algorithms used in the two networks.

As mentioned, the so-called ping-pong effect in connection with off-loading between different cells may result in degraded performance for the user equipment and/or the networks involved. In particular, the inventors have recognized that a particular problem is that a UE with a mobility policy implying offloading to a cell in another RAN, e.g. WiFi, or to another cell of the same RAN, may be rejected from the target cell because of e.g. load conditions in the target RAN node, e.g in the WiFi AP, or in the target cell, or in general because of issues internal to the target RAN node or at least independent from successful radio access.

The proposed technology offers improvements when it comes to the operation of user equipment and/or network nodes in the radio access network(s).

According to a first aspect, there is provided a method, performed by user equipment, for enabling steering of access between cells. With reference to the example of FIG. 12, the method comprises the following steps:

Step 1201: receiving an indication of rejection to access a cell, also referred to as a rejecting cell, due to internal reasons, independent of radio channel conditions, of a network node serving the rejecting cell; and Step 1202: sending to another network node serving an available cell, different from the rejecting cell, a report indicating failure to access the rejecting cell due to internal reasons, independent of radio channel conditions, of the network node serving the rejecting cell.

Normally, the sending of the report indicating failure to access the rejecting cell enables modifying at least one offloading parameter and/or threshold used for steering of access of the user equipment between the available cell and neighbouring cell(s) based on the report.

By way of example, the steering of access involves traffic steering for steering of traffic between radio access networks.

For example, the method may be performed in connection with offloading from a source cell to a target cell, wherein the rejecting cell is a rejecting target cell. The source cell and the target cell may belong to the same radio access network, or the source cell and the target cell may belong to different radio access networks.

Optionally, the source cell and the target cell belong to different radio access networks of different radio access technologies.

As an example, one radio access network is a cellular radio access network and another radio access network is a Wireless Local Area Network, WLAN.

For example, the cellular radio access network may be a 3rd Generation Partnership Project, 3GPP, cellular radio access network.

In an optional embodiment, the network node serving the available cell is different from a source network node hosting the source cell from which offload towards the rejecting cell was originated.

In another optional embodiment, the network node serving the available cell is the same as a source network node hosting the source cell from which offload towards the rejecting cell was originated.

Figure 12:
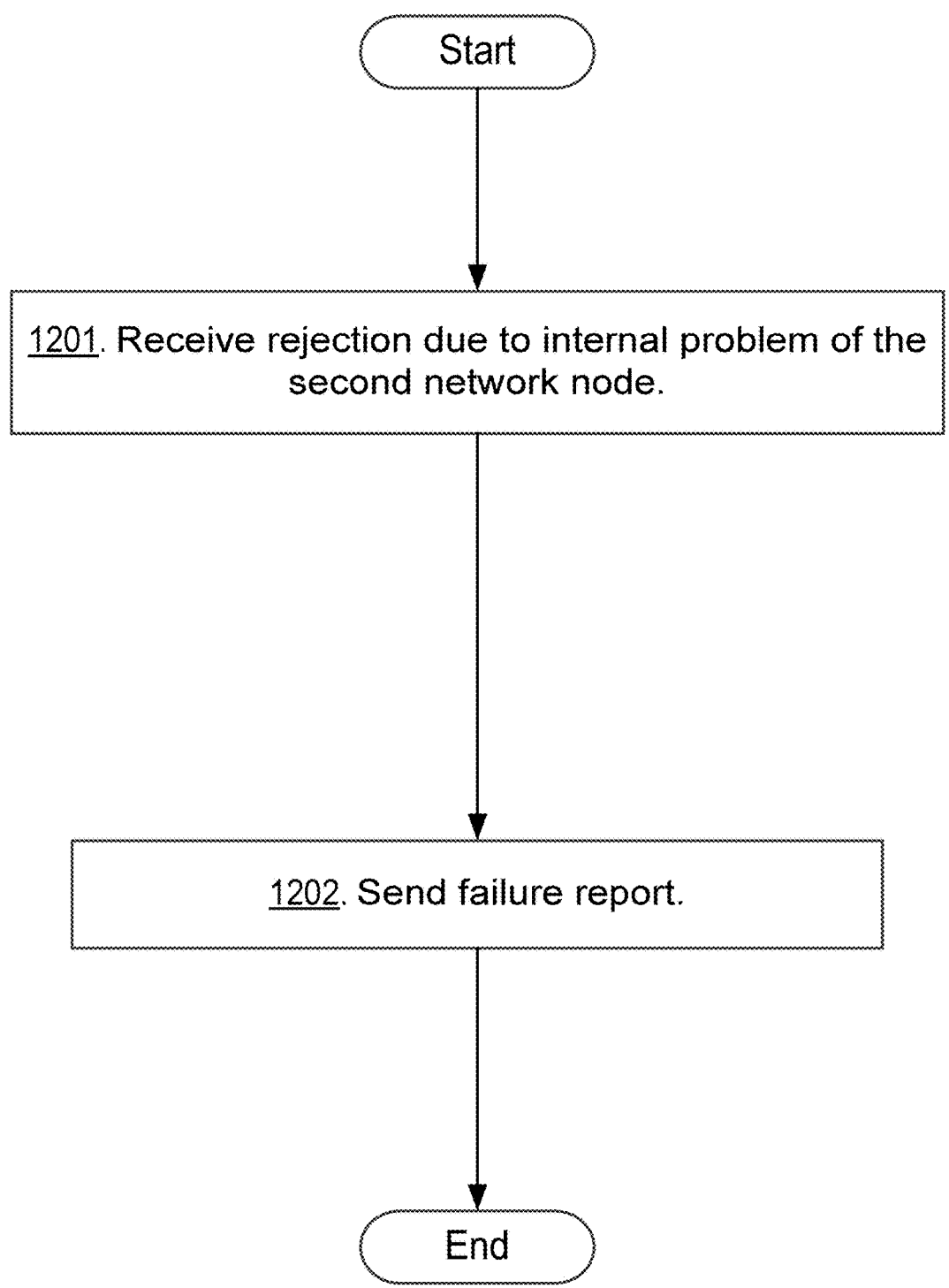
FIG. 12 is a schematic flow diagram illustrating an example of a method, performed by user equipment, for enabling steering of access between cells according to an embodiment.

As indicated in FIG. 12, the network node serving the rejecting cell is sometimes denoted the second network node. Correspondingly, the rejecting cell is sometimes referred to as a second cell.

For comparison, the network node hosting the source cell from which offload was originated is sometimes denoted the first network node, and the source cell is denoted the first cell. The network node serving the available cell is sometimes denoted the third network node, and the available cell is denoted a third cell. The third network node may in some scenarios be the same as the first network node, as will be explained in more detail later on.

Using this terminology, according to an aspect of embodiments herein, an object is achieved by a method in a user equipment for enabling steering of access of user equipments between a third cell and neighbouring cells. The method may comprise any one or more actions out of:

Receiving an indication of rejection to access the second cell due to internal reasons to the second network node. The indication of rejection may comprise an indication of a cause of rejection. This action may be performed by receiving means in the user equipment.

Sending to the third network node a report indicating failure to access the second cell due to internal reasons to the second network node. The report comprises information about the failure. This action may be performed by sending means in the user equipment.

The indication of rejection to access a cell, also referred to as the rejecting cell, due to internal reasons of the rejecting network node is an indication of a rejection that is independent of radio channel conditions. This means that the rejection is not due to lack of successful reception or delivery of radio signals. In other words, the failure to access the cell is not due to, and is consequently independent of, the radio conditions. This also means that the failure report comprises information representative of a failure that is independent of the radio conditions.

In a particular example, the indication of rejection may be an indication of a rejection that is due to load conditions in the network node serving the rejecting cell. Although other internal reasons for rejection exist, as exemplified below, it is anticipated that a large portion of the rejections will be due to load conditions in the rejecting network node.

As an example, the report indicating failure to access the rejecting cell comprises an indication of a cause of the rejection.

For example, the indication of a cause of the rejection may indicate at least one of the following:

Overload, or load-dependent rejection reason;

Not supported bearer/service type, or a rejection cause indicating that the requested data service cannot be provided;

Outage, or a rejection cause due to inability to send to or receive data traffic from the rest of the network;

Transport network failure, or a rejection cause due to issues on the transport network User equipment not allowed in target cell, or a rejection cause due to the fact the user equipment cannot be admitted; and An operator-configured value provided at the time of rejection.

In an optional embodiment, the report indicating failure to access the rejecting cell further may comprise at least one of the following:

Latest measurements collected before offload to target cell;

Identity of target cell where the rejection was experienced;

Identity of source cell serving the user equipment before offload to target cell;

Identity of the cell where the user equipment re-established connection after having been rejected by the target cell;

Time from occurrence of the rejection to the time the failure report is signalled from the user equipment; and Bearer identifiers for bearers supported before offload to target cell.

Figure 13:
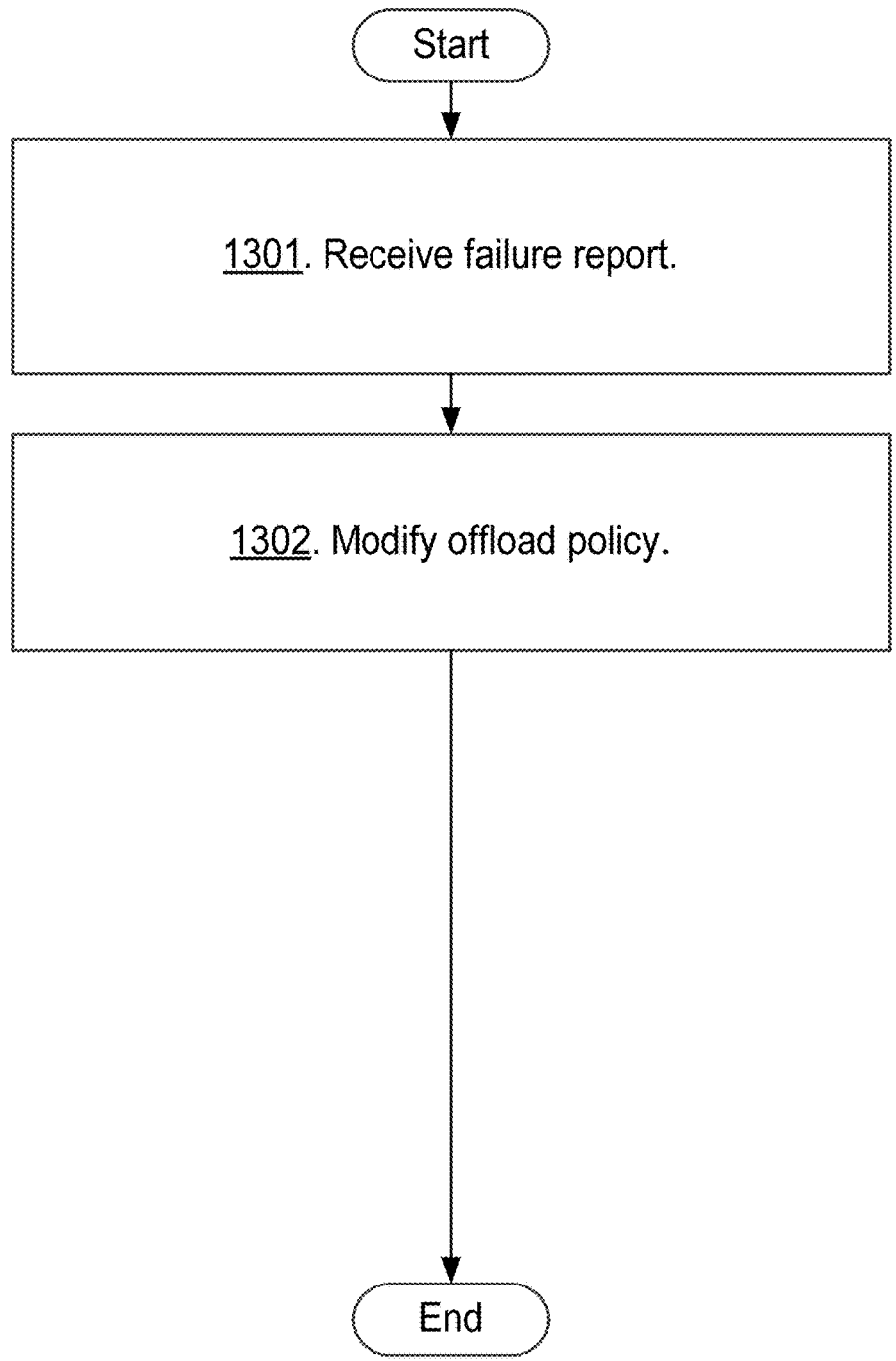
FIG. 13 is a schematic flow diagram illustrating an example of a method, performed by a network node, for steering of access between cells according to an embodiment.

According to a second aspect, there is provided a method, performed by a network node, for steering of access between cells. With reference to the example of FIG. 13, the method comprises the following steps:

Step 1301: receiving, from user equipment, a report indicating failure to access a cell, also referred to as a rejecting cell, due to internal reasons, independent of radio channel conditions, of another network node, also referred to as a rejecting network node, serving the rejecting cell; and Step 1302: steering the access of the user equipment between cells by modifying at least one offloading parameter and/or threshold based on the report indicating failure to access the rejecting cell due to internal reasons of the rejecting network node serving the rejecting cell.

With this new type of report the network can modify offloading parameter(s) and/or threshold(s) in a more suitable way since the network has more information available. The report can be used more or less directly or it can be used as a basis for failure statistics, which can subsequently be used for modifying the offloading parameter(s) and/or threshold(s). Anyway, the report indicating failure to access the rejecting cell can be considered in the modification of steering criteria between cells.

By way of example, the failure in question is a failure occurring not because of radio reasons. In other words, the failure is not due to lack of successful reception or delivery of radio signals. Consequently, the failure is independent of radio channel conditions.

By way of example, the step of steering the access of the user equipment between cells is performed between a cell served by the network node and neighbouring cell(s), and the step of steering the access of the user equipment between the cell served by the network node and the neighbouring cell(s) comprises modifying an offloading parameter and/or threshold in the offload policy to the neighbouring cell(s).

Depending on the definition, the step of modifying an offloading parameter and/or threshold in the offload policy can be regarded as a specific way to modify the offload policy.

For example, the method may be performed in connection with offloading from a source cell to a target cell, wherein the rejecting cell is a rejecting target cell. The source cell and the target cell may belong to the same radio access network, or the source cell and the target cell may belong to different radio access networks.

Optionally, the source cell and the target cell belong to different radio access networks of different radio access technologies.

As an example, a first radio access network is a cellular radio access network and a second radio access network is a Wireless Local Area Network, WLAN.

For example, the cellular radio access network is a 3rd Generation Partnership Project, 3GPP, cellular radio access network.

In an optional embodiment, the step of steering the access of the user equipment between cells may involve avoiding offloading to the rejecting cell for a specific time window or avoiding offloading to the rejecting cell on specific services for a specific time window.

By way of example, the report indicating failure to access a cell may indicate a failure that is due to load conditions in the network node serving the rejecting cell.

As an example, the network node performing the method may be a network node that is available to the user equipment after the user equipment has been rejected to access the rejecting cell served by the rejecting network node.

In an optional embodiment, the network node performing the method is different from a source network node hosting the source cell from which offload towards the rejecting cell was originated.

In another optional embodiment, the network node performing the method is the same as a source network node hosting a source cell from which offload towards the rejecting cell was originated.

In this case, the network node may for example receive the report via an intermediate network node.

Optionally, the network node uses information in the report to build statistics on failure events and to modify offloading policies accordingly.

By way of example, the statistics on failure events may be reported to an operation and maintenance system, e.g. for optimization of network configuration.

As indicated previously, the network node serving the rejecting cell is sometimes denoted the second network node, and the rejecting cell is sometimes referred to as a second cell. The network node hosting the source cell from which offload was originated is sometimes denoted the first network node, and the source cell is denoted the first cell. The network node serving the available cell is sometimes denoted the third network node, and the available cell is denoted a third cell.

Using this terminology, according to another aspect of embodiments herein, an object is achieved by a method in the third network node for steering of access of user equipments between the third cell and neighbouring cells. The method may comprise any one or more actions out of:

Receiving a report from the user equipment, which report indicates failure to access the second cell due to internal reasons to the second network node. The report comprises information about the failure. This action may be performed by receiving means in the third network node. The report may comprise the information given above in relation to the method in the user equipment.

Steering the access of UEs between the third cell and neighbouring cells by modifying an offloading parameter and/or threshold in the offload policy to the neighbouring cells. This action may be performed by modifying means in the third network node. In some embodiments the third network node may forward the report to any other neighbouring network node. The forwarding may be performed by means such as a forwarding module in the user equipment.

As previously mentioned, the failure report indicates a failure that is independent of radio channel conditions.

In the following, the proposed technology will be described with reference to non-limiting examples related to particular scenarios for 3GPP/WLAN interworking. The proposed technology is not limited thereto, and it should be understood that the concepts set forth below are generally applicable for enabling steering of user equipment between cells and/or performing such steering, as exemplified herein.

It may be useful to begin with a brief overview of the state-of-the-art with respect to 3GPP/WLAN interworking. Current Mechanisms for 3GPP/WLAN Interworking from 3GPP In the following disclosure of mechanisms for 3GPP and WLAN interworking the terminology of RAN is used exclusively for a 3GPP RAN.

ANDSF

The Access Network Discovery and Selection Function (ANDSF) contain data management and control functionality necessary to provide network discovery and selection assistance data as per operators' policy [1], [3] and [4]. By supplying information about available 3GPP and non-3GPP access networks to the UE, the ANDSF enables an energy-efficient mechanism of network discovery, where the UE may avoid continuous and energy-consuming background scanning. Furthermore, the ANDSF provides the mobile operators with a tool for the implementation of flexible and efficient UE steering of access mechanisms, where policy control may guide UEs to select one particular RAN over another and where certain traffic should be routed to.

In a roaming scenario, the UE may be provided policies from both the ANDSF entity in the Home PLMN network (H-ANDSF) and the ANDSF entity in the Visited PLMN network (V-ANDSF). In case there are policy conflicts between the two policy sets, the policies coming from the H-ANDSF take precedence [4]. It is also worth noting that user preferences take precedence over both the H-ANDSF and V-ANDSF provided policies.

When communicating with the ANDSF server, the UE provides its location and profile to the ANDSF server. The UE's location may be specified in 3GPP cell IDs, 3GPP2 cell IDs, WiMAX cell IDs, WLAN SSIDs, or explicit geographical location. The UE profile may contain detailed information, such as device capabilities and OS type, which may be used by the ANDSF server to customize the ANDSF information to be sent to the UE. The information sent to the UE basically falls into the category of access network discovery or/and operator policies for access selection.

Rel-12 3GPP RAN Level Integration

RAN level integration that is able to provide more operator control, enhanced user experience and system performance and/or utilization is required as operator controlled WLAN deployments become more common and WLAN usage increases. In order to address this RAN level integration, a study item (SI) was proposed in the 3GPP plenary meeting #58 that addresses the issue of (operator deployed/controlled) WLAN and 3GPP interworking at RAN level [6]. The aim of the SI was to find solutions that address the under-utilization of operator deployed WLANs, sub-optimal UE performance while connected to WLAN and battery drainage due to unnecessary WLAN scanning. Three solutions were proposed during the study item phase as described in [7], named solutions 1, 2 and 3.

Solution 1 is a UE based solution (i.e. UE makes final steering decision), where the ANDSF is enhanced with additional policies that uses 3GPP RAN assistance information provided to the UE through broadcast signaling (and optionally dedicated signaling), as illustrated in FIG. 1. If there are no ANDSF policies deployed or the UE doesn't support it, then an enhanced proprietary Wi-Fi-if-coverage mechanism is used. The assistance information provided to the UE is the RAN load: percentage load, load levels (low, medium, high), offload preference indicator, etc. Additionally or alternatively information such as maximum expected resource allocation for a UE on 3GPP, WLAN RSSI/BSS load thresholds, 3GPP RSRP/Received Signal Code Power (RSCP) thresholds that have to be fulfilled for traffic steering decisions may also be provided to the UE.

The decisions are based on the RAN assistance information, UE measurements, information provided by WLAN and policies, i.e. conditions, that are obtained via ANDSF or via other Open Mobile Alliance Device Management (OMA-DM) mechanisms or pre-configured at the UE to steer traffic to WLAN or to 3GPP RAN. For example, ANDSF ISRP rules may be enhanced to utilize the 3GPP RAN assistance and WLAN provided information:

If 3GPP RAN RSRP is less than threshold s and 3GPP RAN direct load is greater than threshold x, and if WLAN RSSI is greater than threshold r and WLAN BSS load is less than threshold y, move flow to WLAN If 3GPP RAN RSRP is greater than threshold s' and 3GPP RAN direct load is less than threshold x', and if WLAN RSSI is less than threshold r' and WLAN BSS load is greater than threshold y', move flow to UMTS/LTE The value of the thresholds (e.g. 3GPP RAN RSRP/RSCP thresholds) may also be provided by the ANDSF itself rather than included in the 3GPP RAN assistance information.

Figure 2:
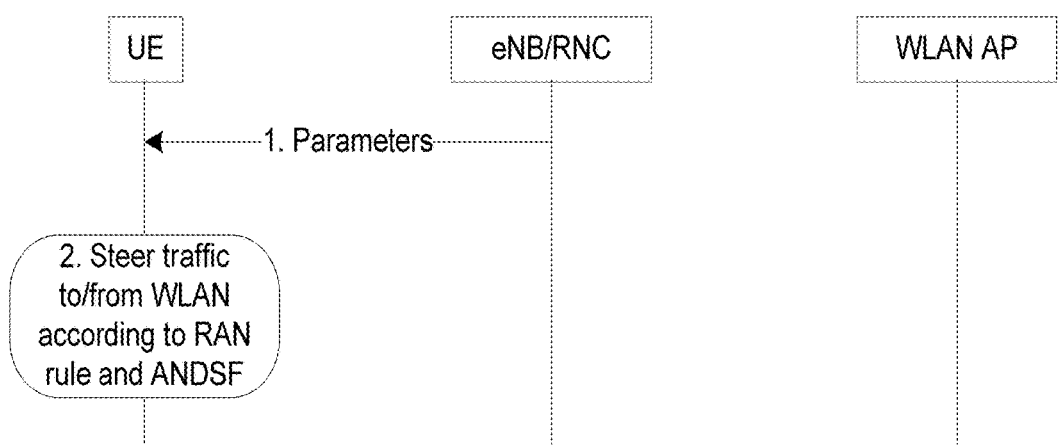

Solution 2 follows principles similar to IDLE mode operations in 3GPP [8] and [9], where the UE follows 3GPP RAN specified rules to perform cell (re-)selection. The 3GPP RAN provides (through dedicated and/or broadcast signaling) thresholds which are used in the rules, as illustrated in FIG. 2.

Below are a couple of examples of 3GPP RAN rules to be specified for solution 2:

If measured_metric_A is less than threshold1 and measured_metric_B is greater than threshold2, move flow to WLAN If measured_metric_A is greater than threshold3 and measured_metric_B is less than threshold4, move flow to 3GPP In the examples above threshold1 to threshold4 are part of the parameters that are communicated from the 3GPP RAN, measured_metric_A to measured_metric_B are measurement values the UE has gathered and the rules themselves are to be specified in 3GPP RAN specifications. In additions to the 3GPP RAN rules, ANDSF rules may also be used (e.g. for flow based traffic steering via ISRP).

Figure 3:
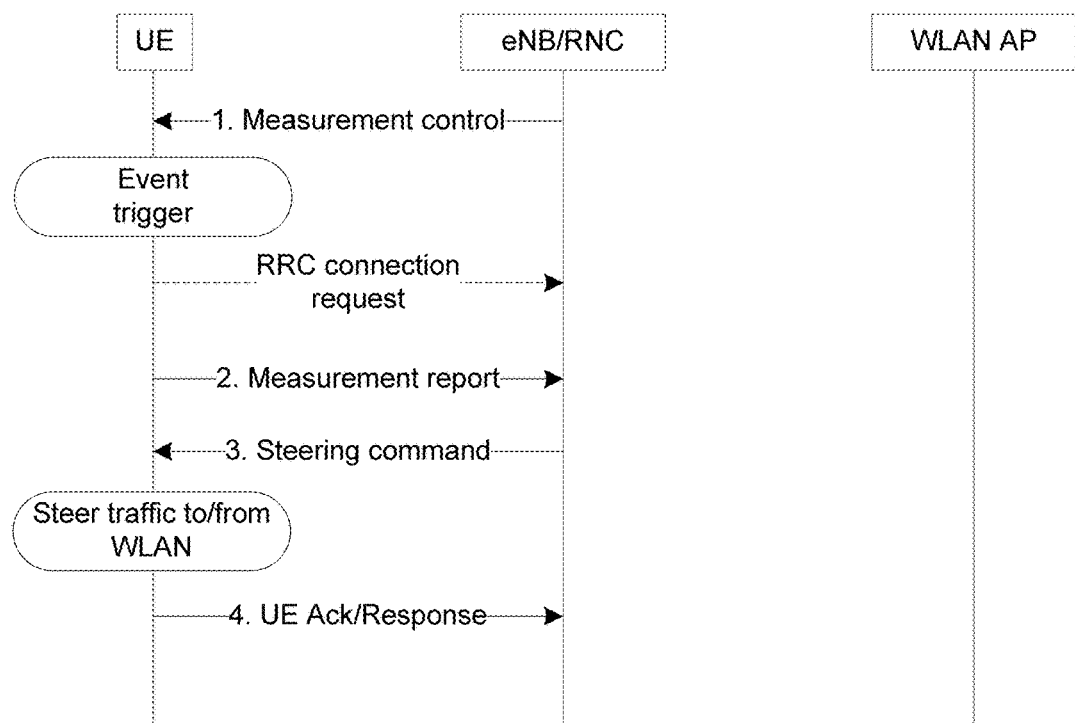

Solution 3 follows principles similar to CONNECTED mode operations in 3GPP [10] and [11], where the following steps are employed for traffic steering as illustrated in FIG. 3:

a. Measurement control configuration: the RAN sends information to the UE that includes details like the target WLAN(s) to be measured, e.g. specific identities such as SSIDs/BSSIDs/HESSIDs or more general information like operating frequencies, events/thresholds for triggering measurement reports, e.g. when WLAN signal becomes better/worse than a certain threshold, WLAN signal becomes better/worse than a certain threshold and 3GPP signal becomes worse/better than another threshold, etc.

b. Measurement reporting: When the conditions for triggering thresholds, as configured in Step 1 above, are fulfilled, the UE sends a measurement report to the 3GPP RAN.

c. Traffic steering: Based on the measurement report received in Step 2, the RAN evaluates the received measurements and other relevant information obtained in eNB/RNC and as a result of this sends a traffic steering command to the UE, which may specify the traffic to be steered. This may be explicit indication of each bearer to be moved, i.e. by specifying DRB/RB-IDs, or more general like the QoS Class Identifier (QCI), which may apply to many bearers at once.

d. UE ACK/Response: In this step the UE indicates to the RAN whether or not the action dictated by the traffic steering command was successfully performed or not.

UEs in IDLE mode may request to setup an RRC connection for the sake of sending measurement reports when the conditions of Step 1 are satisfied. Alternatively, solution 1 or 2, which are equally applicable to both IDLE and CONNECTED UEs, might be employed for handling IDLE UEs while solution 3 is used only for CONNECTED UEs.

In the RAN #62 plenary meeting, a decision was made to go forward with a work item (WI) that proposes a solution that is a mixture of solution 1 and 2 [12]. The objective of this work item is to specify mechanism for WLAN/3GPP access network selection and traffic steering consisting.

For the Access Network Selection part:
Selected RAN assistance parameters transferred via system broadcast and/or dedicated signalling used within:
RAN rules defined within RAN WG specifications in case enhanced ANDSF is not deployed in the network or not supported by the UE.
ANDSF policies in case enhanced ANDSF is deployed in the network and supported by the UE.
RAN assistance information may be enhanced with WLAN identifiers in case ANDSF is not deployed or not supported by the UE.

For the Traffic Routing part:
Selected RAN assistance parameters transferred via system broadcast and/or dedicated signalling used within:
RAN rules specified in RAN2 WG specifications in case enhanced ANDSF is not deployed or not supported by the UE.
ANDSF policies in case enhanced ANDSF is deployed in the network and supported by the UE.
RAN assistance information may be enhanced with traffic routing information (e.g. offload granularity) in case ANDSF is not deployed or not supported by the UE.

Proprietary Solutions
If both the 3GPP and WLAN networks are from the same vendor and proprietary interfaces are available either directly between the 3GPP and WLAN or indirectly via other CN entities, proprietary steering mechanisms may be employed.

Figure 4:
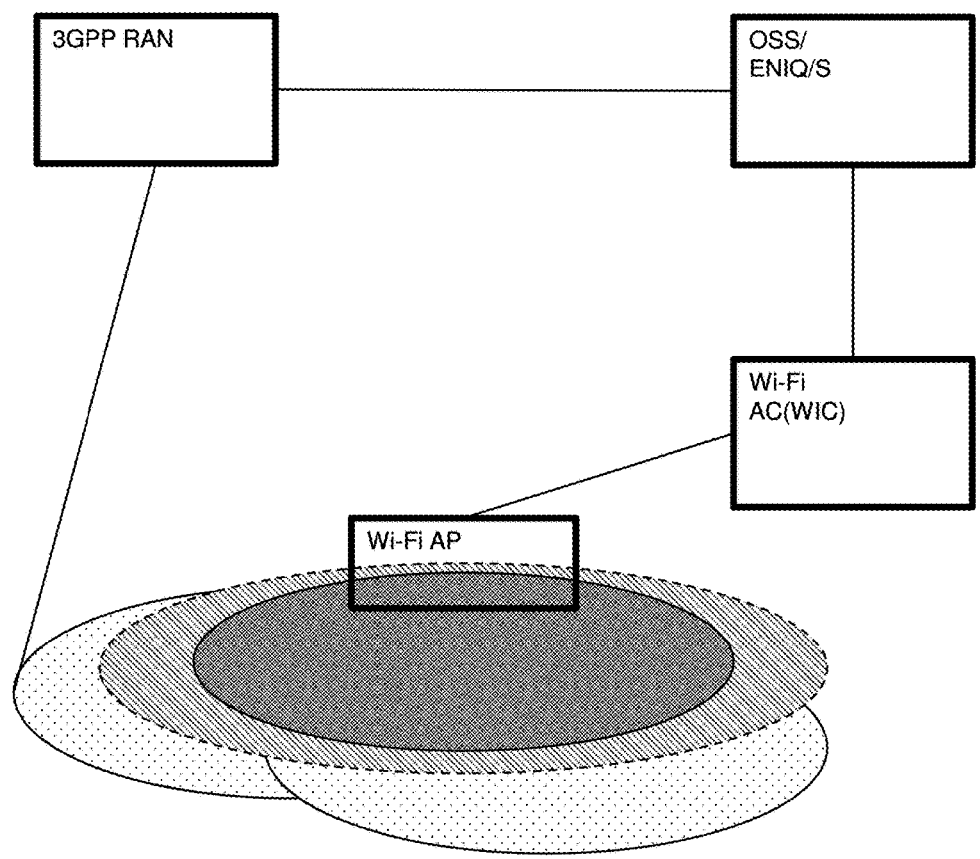
FIG. 4 is a schematic diagram illustrating an example of an architecture behind a proprietary steering solution based on the principle of Self Optimizing Networks, SON.

FIG. 4 illustrates the architecture behind one such solution, which is based on the principles of Self Optimizing Networks (SON). When a UE is in the common coverage area of a 3GPP cell and Wi-Fi, cell loading statistics based on historical performance will determine the optimal access link for the UE. By distributing users in such a way among both networks, better use of resources is achieved and the average end user experience improved. With this solution, the Wi-Fi Access Controller (AC), sets uplink Received Signal Strength Indication (RSSI) thresholds based on the information that it gets from the Operation Support System (OSS). If the expected performance in 3GPP is high, the RSSI threshold will be set to high (i.e. only UEs with very good WLAN link quality will be allowed). Similarly, if the expected performance is low, the RSSI threshold will be set to low (i.e. even UEs with not so good WLAN links may benefit from offloading to WLAN).

A legacy UE operating under the Wi-Fi-if-coverage access selection algorithm described in above will try to offload to a WLAN AP whenever in coverage of the WLAN. In order to do so, the UE has first to associate/authenticate itself with the WLAN AP. When such a request is received by the WLAN AC, the AC rejects the request if the RSSI of the received request is below the current RSSI threshold.

Figure 5:
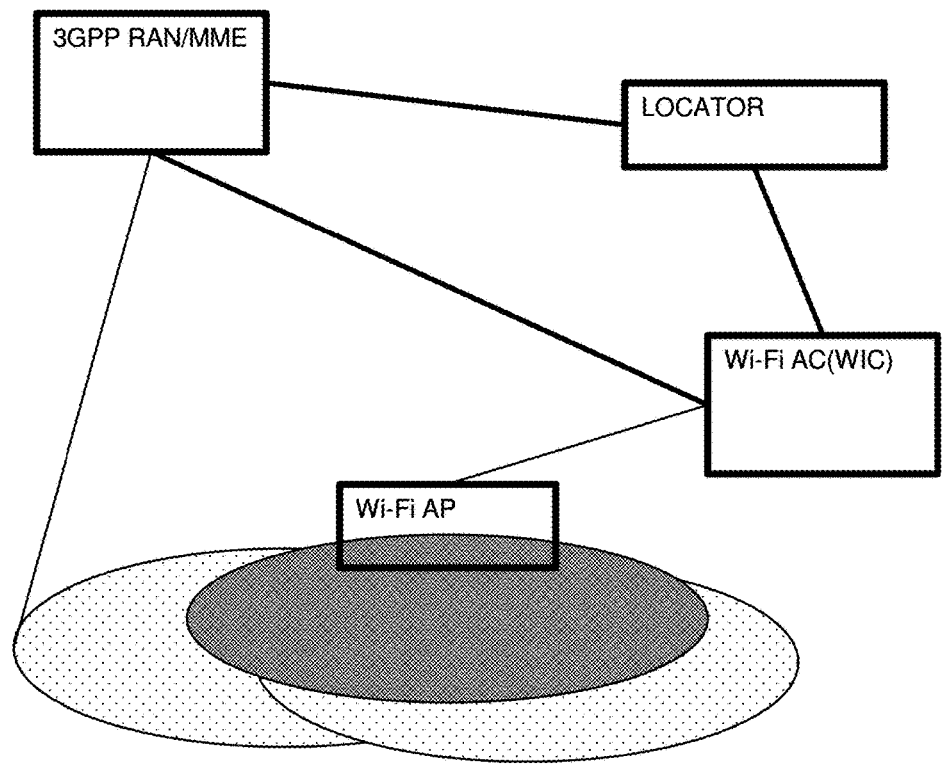
FIG. 5 is a schematic diagram illustrating an example of an alternative architecture for access selection.

Though the solution described above may help both user and system performance, it is not based on real-time information on 3GPP (rather statistical and last performance report) and thus there is always a delay inherent in gathering and reflecting average end user performance data. Not only that, the RSSI threshold setting is not UE specific (i.e. the same RSSI threshold for all the UEs within the coverage of the same WLAN AP, regardless of the requirements of each specific UE), and also it is not 3GPP cell specific (i.e. no knowledge of the 3GPP cell the UE is in and the expected performance is the average of all the cells that have common coverage with the WLAN AP). FIG. 5 shows the architecture of an alternative solution. As seen in FIG. 5, locator functionality is introduced that keeps track of the 3GPP cell the UE is associated with. When the AC receives an attachment request to Wi-Fi, it will query the locator to identify the exact 3GPP cell for that UE. Then the AC sends out a request to the 3GPP controller node that controls the 3GPP cell the UE is coming from, the request containing information such as a UE identification that is common to both 3GPP and Wi-Fi and the expected throughput in Wi-Fi if that user is admitted. The 3GPP controller will evaluate if the indicated expected performance in Wi-Fi is better than the one the UE is getting in 3GPP at that time, and if so sends a reply to the AC to admit the UE. Otherwise (i.e. Wi-Fi worse than 3GPP for the concerned UE), then the reply tells the AC to reject the UE's admission request.

The access selection decision employed by this solution takes into account the specific situation of the UE, the cell etc. and thus it is not the same performance for a user at the cell center than at the cell edge (which was the same in the solution of FIG. 4). Cell conditions on load, number of users, schedulers, backhaul, etc. changes along time, which means per user and real time decision will provide a better end user performance as compared to cell level decisions of FIG. 4.

Traffic Steering from WLAN to 3GPP

Wi-Fi Alliance (WFA) is currently discussing several scenarios for steering traffic between different WLAN frequencies (2.4 GHz and 5 GHz) and also redirecting a UE to 3GPP from WLAN are being discussed. The WLAN AP and the cellular base station may be co-located, e.g. in an integrated picocell, or may be separate Wi-Fi APs "under" a macro cellular base station. The cellular and Wi-Fi networks are authenticated by the same operator. Both networks are typically (but not necessarily) deployed by the same operator looking to offload or maximize user experience.

Two scenarios concerning the steering of STAs from WLAN to 3GPP are being discussed in WFA:

Wi-Fi to Cellular Steering at Association

A multi-mode station (STA, the equivalent term for UE in the WLAN world), having both Wi-Fi radio(s) and cellular radio(s), attempts to associate to an AP. The AP has knowledge (e.g.) of its current load, the interference situation, UL/DL signal strength at the AP and AP network connection status. Because of one or more of these parameters, the AP decides not to accept the newly joining STA.

To solve the problem, the AP is enabled to explicitly steer the multi-mode STA to a network that could provide a better service—in this case a cellular one. In that way, the Wi-Fi load is not further aggravated and the user experience is maintained or improved.

Wi-Fi to Cellular Steering Post Association

A multi-mode STA is already associated to an AP. The AP has knowledge (e.g.) of its current load, the interference situation, U/L signal strength at the AP and AP network connection status. At a certain point in time, one or more of these parameters reach an unacceptable level. To solve the problem, the AP should be able to explicitly steer the multi-mode STA to a network that could provide a better service—in this case a cellular one. In that way, the Wi-Fi load is alleviated and the user experience is maintained or improved.

The cellular and Wi-Fi networks are authenticated by the same operator. Both networks are typically (but not necessarily) deployed by the same operator looking to offload or maximize user experience Mobility Robustness Optimization in 3GPP Handover in LTE is controlled via several parameters such as cell/frequency specific offsets/thresholds, time to trigger, hysteresis duration, and so forth [11]. Incorrect parameter settings may lead to several problems such as:

Radio Link Failure (RLF): if the parameters are set in such a way that the UE doesn't report handover measurements on time, or that the UE does not receive a handover command on time, the UE might lose the connection with the original cell before handover is initiated. This is known as Too Late HO and the UE tries to re-establish the connection with another cell after the RLF detection timers have expired. On the other hand, if the parameters are set to trigger handover very early, RLF might occur shortly after handover in the target cell. This is known as Too Early HO and the UE tries to re-establish the connection with the source cell after the RLF detection timers have expired. Even if the handover is triggered at the right time, incorrect settings of the CIO may make the UE to handover to a wrong cell, which is followed by an RLF either during or after completion of the handover and a re-establishment request in a cell other than the target cell or the source cell. This is known as HO to a wrong cell.

Ping pong handover: improper handover parameter setting may make the UE handover back and forth between two neighbouring cells. An example of this is a setting that makes the triggering conditions for the handover events (A3) valid between the source and neighbour cells at the same time.

When the UE receives a certain number of (N310) consecutive "out of sync" indications from lower layer, it assumes a physical layer problem is ensuing, and a timer (T310) is started. If the UE doesn't receive a certain number of (N311) consecutive "in sync" indications from the lower layer before T310 expires, RLF is detected. RLF is also detected when random access problem is indicated from MAC or upon indication that the maximum number of RLC retransmissions has been reached.

Another type of failure is a HO failure. When the UE receives a HO command (i.e. RRCConnectionReconfigurationRequest with mobilityControlInfo, as shown in FIG. 2), it starts a timer (T304), and if this timer expires before the HO is completed (i.e. RRCConnectionReconfiguration-Complete message is sent by the UE), a HO failure is detected.

When a RLF is detected by the UE, the UE starts a timer (T311) and tries to re-establish the connection to the best available cell (e.g. the source cell, another cell belonging to the same source eNB or a neighbour cell belonging to another eNB). When sending the re-establishment request: (RRCConnectionReestablishmentRequest), the UE includes the following information ([11]):
- Global Cell ID (GCID) of the last cell the UE was connected to before RLF
- UE Identity: the CRNTI as well as MAC ID for context lookup
- Re-establishment cause: whether the request is due to handover failure, reconfiguration failure, or other causes If the UE context is found in the cell (if it is the source cell or if it was a cell prepared for handover, i.e. handover was ongoing when the RLF happened and the cell where the UE re-appeared already has the UE context, which was communicated to it from the source cell during Handover Request message exchange), the connection is re-established. Otherwise (if UE context is not available, or re-establishment didn't succeed before T311 expires), the UE has to go to IDLE mode all the active bearers have to be torn down, if any. A bearer setup procedure may be started, if required.

The eNB to which the UE is reconnecting to, either through a successful RRC re-establishment or via RRCConnectionSetup after IDLE mode, may ask for more detailed information about the failure after the connection is completed via the UE Information Request procedure, where the eNB may ask for RLF report. The UE responds by sending a UEInformationResponse message with a detailed RLF report which may include information such as ([11]):
- Measurement result of the last served cell before RLF
- Measurement result of the neighbour cells performed before RLF
- Location info, which may include last co-ordinates as well as velocity of the UE when RLF was detected
- E-CGI (and if that is not available Physical Cell ID (PCI)) of the cell where RLF occurred
- E-CGI of the cell that the re-establishment attempt was made at
- If the RLF occurred after the reception of a HO command (i.e. RRCConnectionReconfiguration message including the mobilityControlInfo):
  - The E-CGI where this message was received
  - Time from reception of HO Command to occurrence of RLF
- The elapsed time from RLF occurrence to signaling by the UE of the RLF Report
- Failure type: i.e. whether it is a normal radio link failure or a handover failure
- Cause for the RLF: i.e. whether RLF is due to maximum number of RLC retransmission, expiration of T310 timer, RACH access failure
- C-RNTI of the UE in last serving cell
- Information about last serving and re-establishment UTRAN cells, for cases of LTE-UTRAN mobility Configuring all the HO parameters manually is too expensive and may be very challenging. As such, Mobility Robustness Optimization (MRO) has been introduced in 3GPP to automate the dynamic configuration of handover parameters. MRO tries to gather statistics on the occurrence of Too Late HOs, Too Early HOs and HO to the wrong cell, and these statistics are used to adjust the handover parameters such as Hysteresis, CIO and TTT.

For MRO, the different HO problems discussed above are communicated between neighbouring cells in different ways.

For Too Late Handovers, an RLF INDICATION message is sent via X2 from the eNB to which the UE tries to re-establish a connection and reports RLF Report to the eNB where the RLF occurred. The RLF INDICATION message contains:
- PCI of the cell in which the UE was connected prior to RLF (known as failure cell)
- ECGI of the cell where RRC re-establishment attempt was made
- UE Identity: C-RNTI and ShortMAC-I of the UE in the failure cell as contained in the RRC Re-establishment Request
- RLF report (in a UE RLF Report Container IE)
- RRC Conn Setup Indicator, namely an indicator of whether the UE went to Idle before reporting the RLF Report
- RRC Conn Reestab Indicator, i.e. an indicator of the re-establishment cause used in the RRC re-establishment request If an eNB receives an RLF INDICATION message from a neighbour eNB, and if it finds out that it has sent a UE CONTEXT RELEASE message towards that neighbour eNB within the last Tstore_UE_cntxt seconds (i.e. it means that very recently the concerned UE was handed over properly to it from the same eNB), the eNB responds by sending a HANDOVER REPORT message that indicates Too Early Handover.

If an eNB receives an RLF INDICATION message from a neighbour eNB, and if it finds out that it has sent a UE CONTEXT RELEASE message towards another neighbour eNB within the last Tstore_UE_cntxt seconds (i.e. it means that very recently the concerned UE was handed over properly to it from another eNB), the eNB responds by sending a HANDOVER REPORT message that indicates Handover to the Wrong Cell.

The HANDOVER REPORT message contains:
- Type of detected handover problem (Too Early Handover, Handover to Wrong Cell);
- ECGI of source and target cells in the handover;
- ECGI of failure target cell in the handover;
- ECGI of the re-establishment cell (in the case of Handover to Wrong Cell);
- Handover cause (signalled by the source during handover preparation).
- Target cell in UTRAN in case of IRAT handover between LTE and UTRAN The C-RNTI of the UE in the source cell (as contained in the AS-config IE received over HO preparation signalling Mobility Information: an identifier provided in the Handover Request and identifying the UE Context RLF Report as part of an UE RLF Report container IE Thus, by analysing the received RLF INDICATION and HANDOVER REPORT messages within certain duration, eNBs may configure the optimal HO parameters to be used with their neighbours.

Inter-RAT Mobility Robustness Optimization

Extending the LTE MRO for inter-RAT scenarios has also been discussed in 3GPP. The agreed high priority scenarios for inter-RAT mobility in 3GPP are ([13]):

Scenario 1) Failure while in LTE or during a HO to 2G/3G, reconnection at 2G/3G (too late HO)

Scenario 2) Failure during or after a HO from 2G/3G to LTE and reconnection back at 2G/3G (source RAT), may be at different cell than the source one (too early HO).

HOF during an HO (during RACH attempt in LTE)

RLF in LTE shortly after a HO (after successful RACH)

Figure 6:
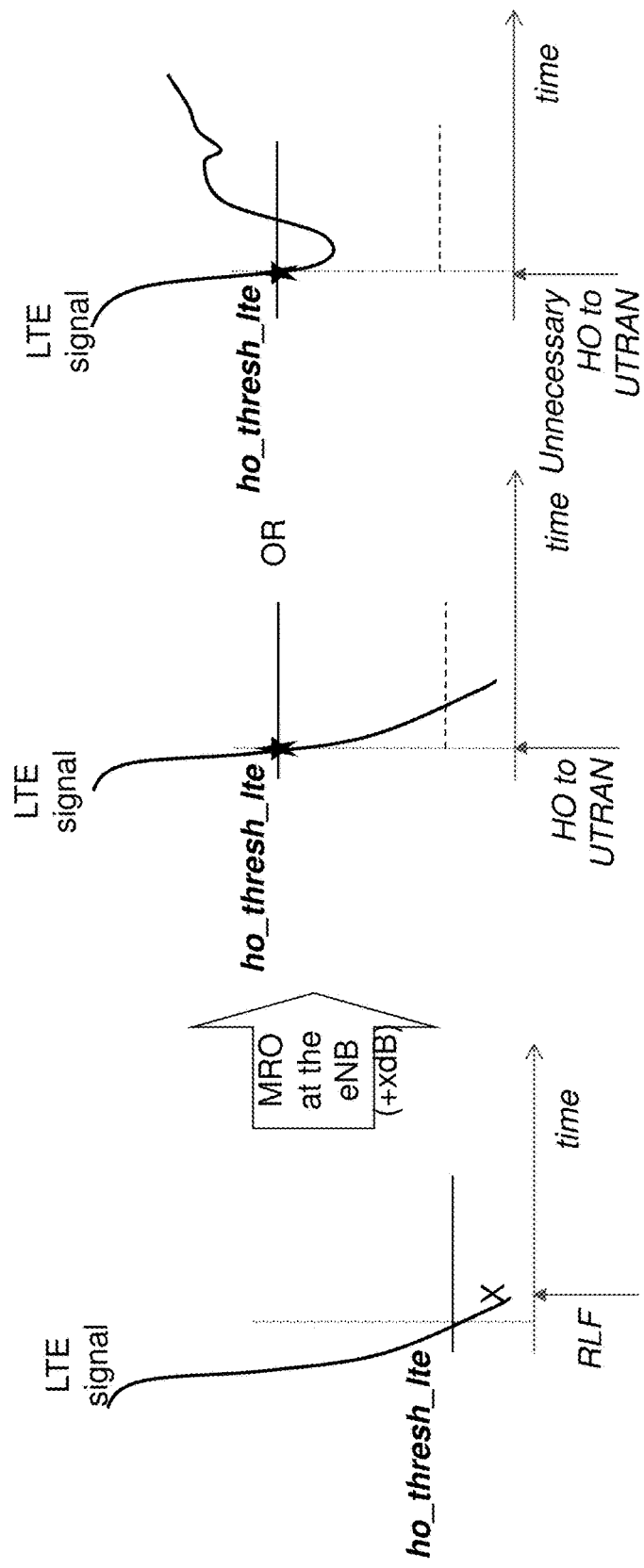
FIG. 6 is a schematic diagram illustrating an example of triggering of handover from LTE to UTRAN based on an associated threshold value.

The triggering of IRAT HO from LTE to UTRAN is controlled by parameters in LTE associated to each measurement type RSRP and RSRQ (referred here as ho_thresh_lte). One way to optimize scenario 1 (too late HOs from LTE to UTRAN/GERAN) could be increase the value of this threshold in order to trigger HO earlier. The side effect of this action may be an increased number of unnecessary HOs i.e. the LTE coverage is good enough but the connection is anyway handed over to UTRAN. An MRO algorithm should take this tradeoff into account to increase or decrease the thresholds ho_thresh_lte. This tradeoff is illustrated in FIG. 6.

Figure 7:
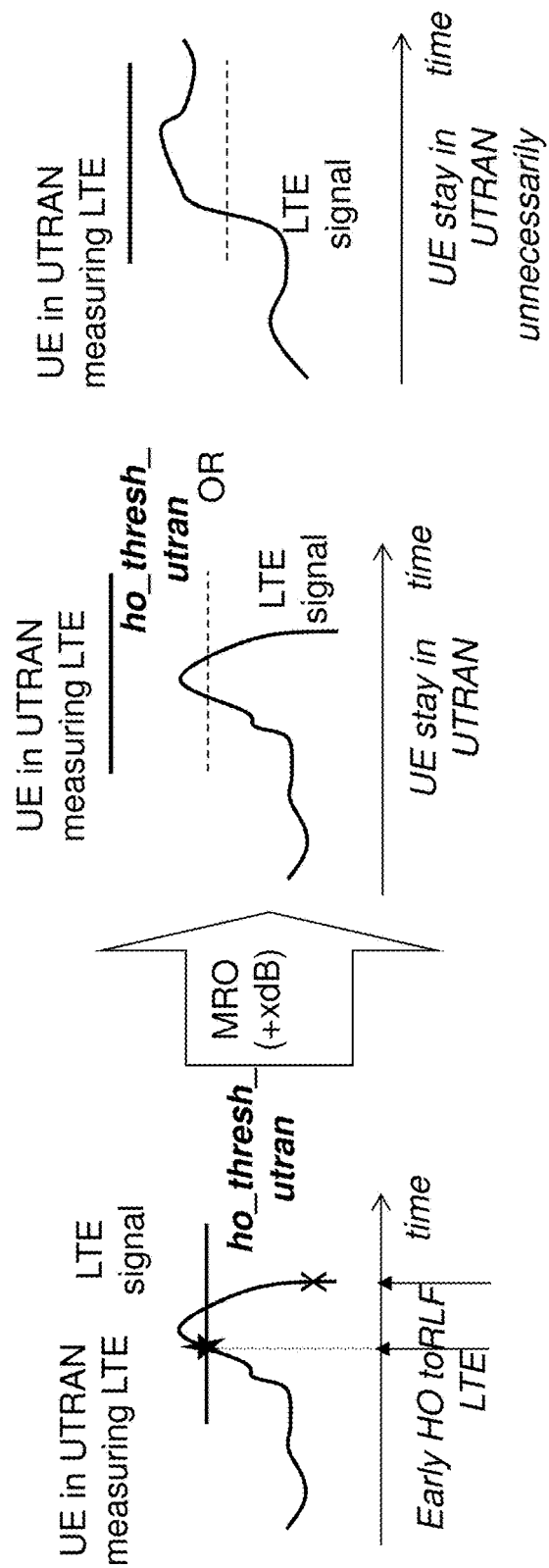
FIG. 7 is a schematic diagram illustrating an example of triggering of handover from UTRAN to LTE based on an associated threshold value.

The triggering of IRAT HO from UTRAN to LTE is controlled by two other parameters in UTRAN for each measurement type RSRP and RSRQ called in this document ho_thresh_utran. The scenario 2, described earlier in this document (early HOs from UTRAN to LTE) may be optimized by increasing the value of these thresholds in order to only trigger HO to LTE when the signal is strong enough to retain the connection. The side effect of this action could be the unnecessary time in UTRAN if this parameter is set too high i.e. there is enough LTE coverage but the UE keeps in UTRAN. An MRO algorithm should also take this second tradeoff into account and increase or decrease the thresholds ho_thresh_utran at the UTRAN side. This second tradeoff is illustrated in FIG. 7.

Different solutions have been proposed in order to make RLF info available in the RATs running MRO algorithms ([13]). Out of proposed solutions the one relevant to this case and also partially adopted by 3GPP is reported below.

Figure 8:
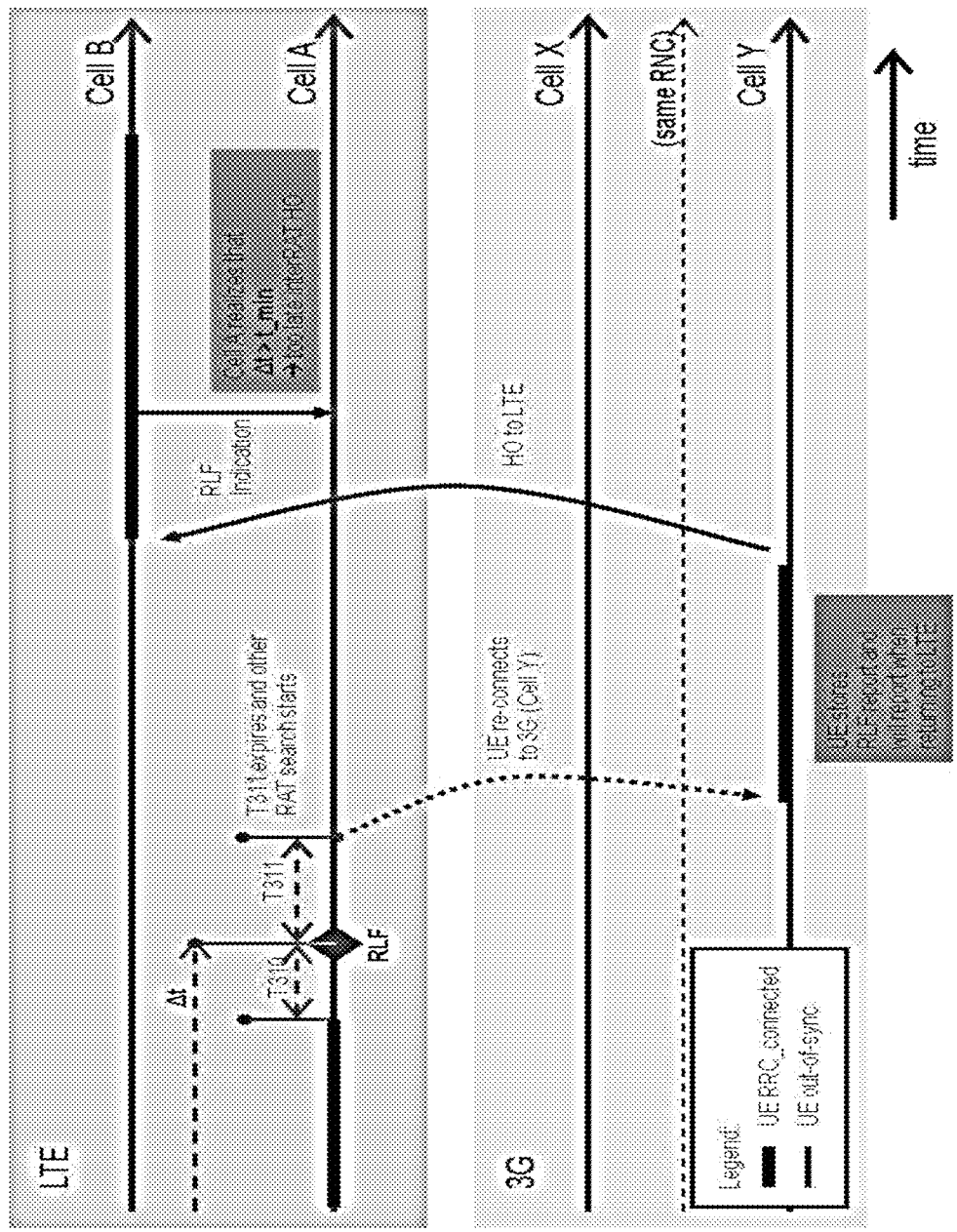
FIG. 8-9 are schematic diagrams illustrating an example of making a Radio Link Failure, RLF, report available to the network when returning to LTE.
Figure 9:
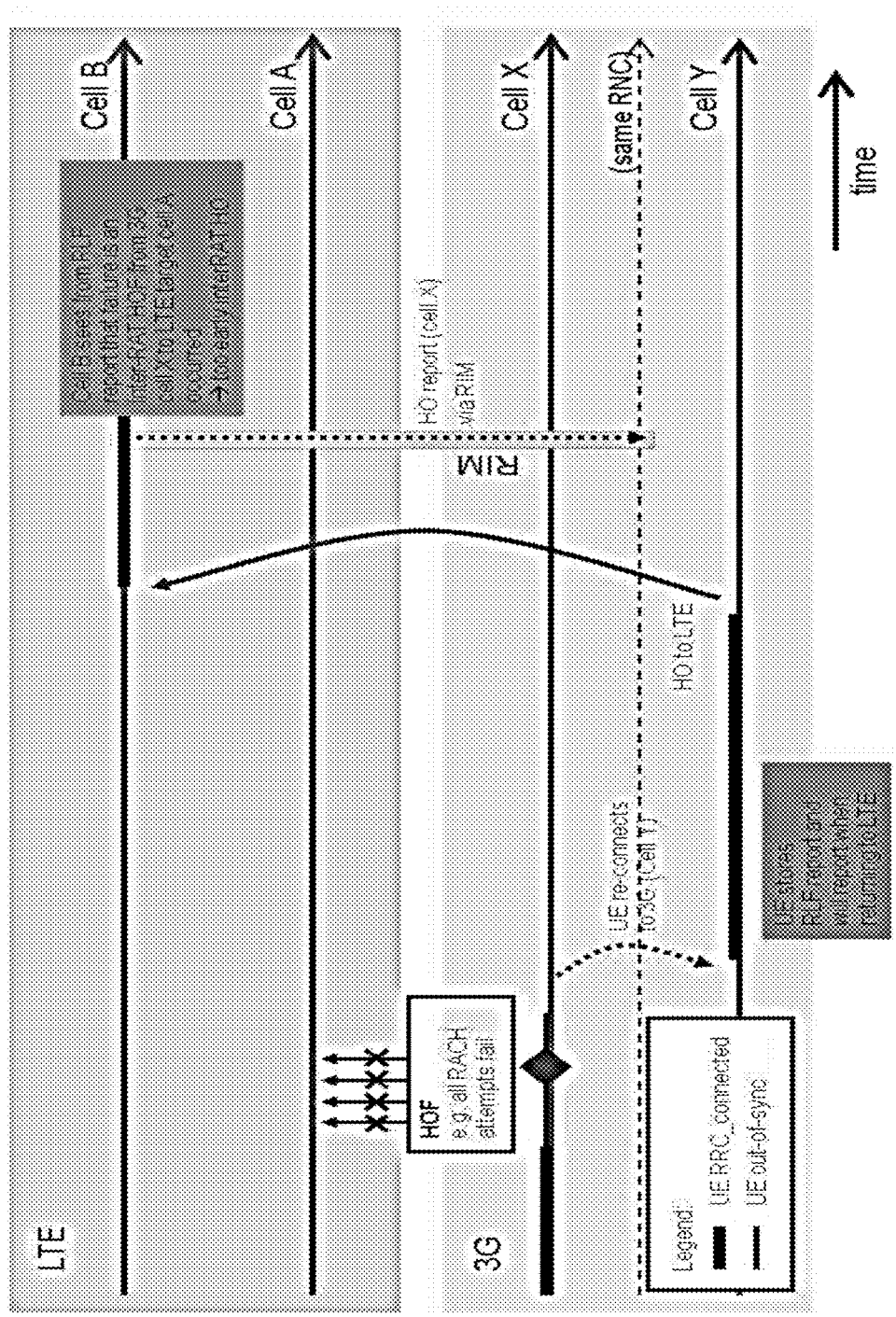

Solution 1—UE RLF report when returning to LTE: For both scenario 1 and 2, when the UE re-connects after the failure to a 2G/3G cell, it stores the necessary failure information. Then, when the UE is back to LTE the failure information is made available for the network (e.g. as a RLF Report). The cell that fetches the RLF report from the UE, forwards it to the cell where the failure occurred (via X2 or S1 for scenario 1 and 2b, and RIM to the RNC serving the cell before the IRAT handover). This solution for the UTRAN/LTE case is presented in FIG. 8 and FIG. 9.

Figure 10:
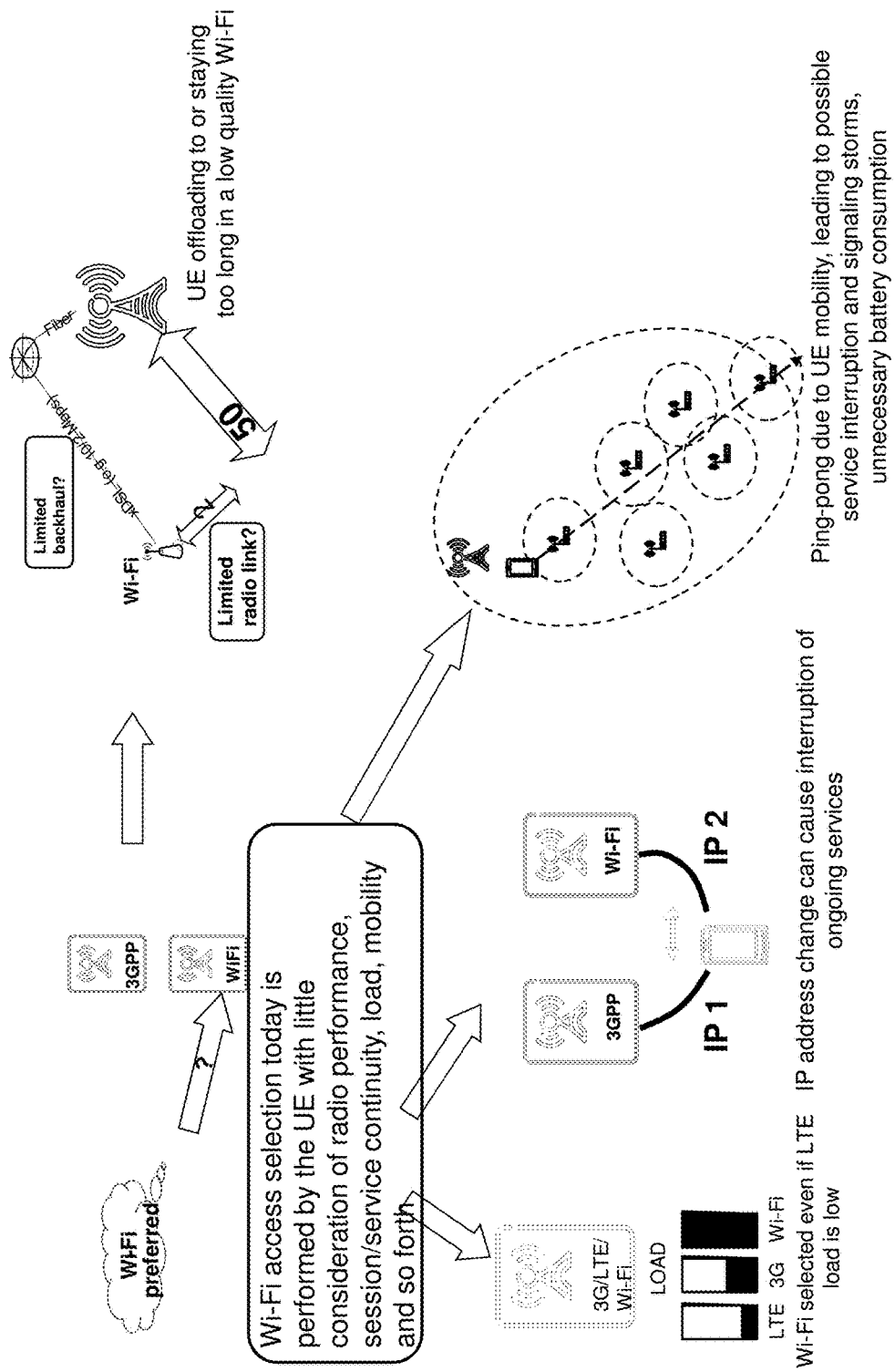
FIG. 10 is a schematic diagram illustrating examples of different drawbacks of the conventional "WiFi-if-coverage" strategy.

There are several drawbacks of the "Wi-Fi-if-coverage" strategy, illustrated in FIG. 10. Though the user/UE may save previous pass codes for already accessed Wi-Fi Access Points (APs), hotspot login for previously non-accessed APs usually requires user intervention, either by entering the pass code in Wi-Fi Connection Manager (CM) or using a web interface.

No consideration of expected user experience is made except those considered in the UE implemented proprietary solution, and this may lead to a UE being handed over from a high data rate mobile network connection to a low data rate Wi-Fi connection, as presented in FIG. 10. Even though the UE's OS or some high level software is smart enough to make the offload decisions only when the signal level on the Wi-Fi is considerably better than the mobile network link, there may still be limitations on the backhaul of the Wi-Fi Access Point (AP) that may end up being the bottleneck.

No consideration of the load conditions in the mobile network and Wi-Fi are made, FIG. 10. As such, the UE might still be offloaded to a Wi-Fi AP that is serving several UEs while the mobile network (e.g. LTE) that it was previously connected to is rather unloaded.

Interruptions of on-going services may occur due to the change of IP address when the UE switches to the Wi-Fi network (FIG. 10). For example, a user who started a Voice over IP (VoIP) call while connected to a mobile network is likely to experience a call drop when arriving home and the UE switching to the Wi-Fi network automatically. Though some applications are smart enough to handle this and survive the IP address change, e.g. Spotify®, the majority of current applications do not. This places a lot of burden on application developers if they have to ensure service continuity.

No consideration of the UE's mobility is made, see FIG. 10. Due to this, a fast moving UE may end up being offloaded to a Wi-Fi AP for a short duration, just to be handed over back to the mobile network. This is specially a problem in scenarios like cafes with open Wi-Fi, where a user walking by or even driving by the cafe might be affected by this. Such ping pong between the Wi-Fi and mobile network may cause service interruptions as well as generate considerable unnecessary signaling (e.g. towards authentication servers).

Further information on MRO, RLF and/or WLAN offloading can be found, e.g. in references [15-19].

As described above, there are several mechanisms for steering UEs between 3GPP and WLAN. Specifically, a UE may be steered from 3GPP to WLAN based on the fulfillment of thresholds and/or conditions that were communicated to it from 3GPP, either RAN rules, or ANDSF, as described above. However, the UE upon trying to associate with the WLAN that fulfilled the thresholds and/or conditions may end up being rejected by the WLAN, e.g. either by a proprietary solutions as described above or by the WFA solutions currently being discussed that were described above. This may cause the UE to ping pong between the two networks, wasting system resources, UE battery and degrading the end user performance.

It is worth noting that this problem is different from the MRO scenarios described for IRAT mobility because the rejection in WiFi is not due to a radio link failure, but rather it is due to issues internal to the WiFi AP. Therefore the UE may monitor good channel conditions towards the WiFi AP, and yet be rejected once moved to the AP.

At the same time, the existing mechanisms for MRO do not take into account either cases for mobility failure to and from WiFi and also they do not take into account mobility issues that are not due to radio link failure or handover failure, or in other words issues that do not depend purely on radio channel conditions.

Embodiments herein aim at alleviating at least some of these problems.

By way of example, embodiments herein enable steering of UEs between different network nodes and/or different cells based on information indicating failure to connect to a network node or cell due to internal reasons of the network node or cell.

For example, embodiments herein aim at harmonizing the steering of UEs from 3GPP to WLAN and from WLAN to 3GPP in such a way that ping pong scenarios are avoided. Failure reporting is used to address also WLAN rejections, so that the offloading thresholds/conditions that are used for steering in both directions (i.e. 3GPP to WLAN and WLAN to 3GPP) may be set in an optimal way.

The availability of WLAN rejection reports to 3GPP makes it possible for the 3GPP network to dynamically adjust the thresholds/conditions that are used to trigger steering from 3GPP to WLAN.

In some embodiments a term "network node" is used and it may correspond to any type of radio network node or any network node, which communicates with at least a radio network node.

In some embodiments the non-limiting term user equipment (UE) is used and it refers to any type of wireless device communicating with a radio network node in a cellular or mobile communication system. Examples of UEs are target device, device to device UE, machine type UE or UE capable of machine to machine communication, PDA, iPAD, Tablet, mobile terminals, smart phone, laptop embedded equipped (LEE), laptop mounted equipment (LME), USB dongles and so forth.

Note that although terminology from 3GPP LTE/SAE may be used to exemplify the embodiments herein, this should not be seen as limiting the scope of the embodiments herein to only the aforementioned system. Other wireless systems may also benefit from exploiting the ideas covered within this disclosure.

Also note that terminology such as a first network node and a second network node should be considered to be non-limiting and does in particular not imply a certain hierarchical relation between the two.

Below, the proposed technology will be illustrated in more detail by reference to a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 11A:
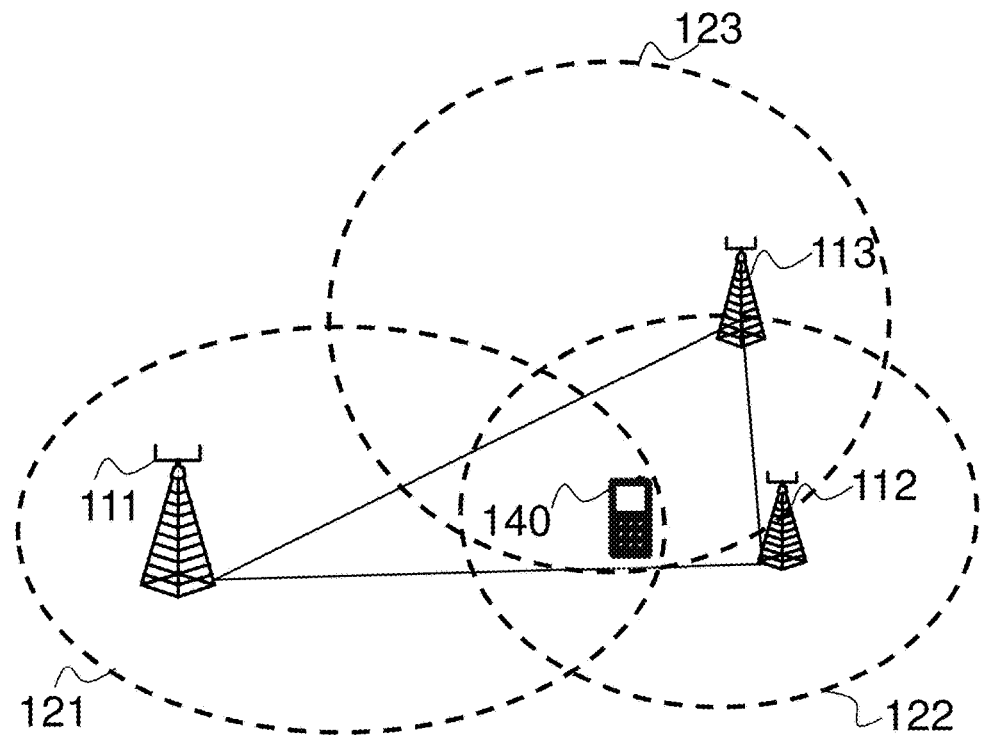
FIG. 11A is a schematic diagram illustrating an example of parts of a first radio access network and a second radio access network.
Figure 11A:
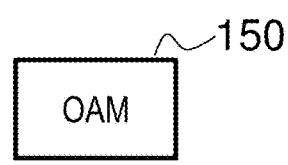

FIG. 11A depicts parts of a first RAN and a second RAN. The first RAN may for example be an LTE, UMTS, GSM, any 3GPP cellular RAN, Wimax, or any cellular RAN or system. The second RAN may for example be a non-3GPP RAN, such as a WLAN. In the following embodiments it will be assumed that the first RAN is an LTE RAN and the second RAN is a WiFi RAN if nothing else is stated. However, in some embodiments the order may be reversed such that the second RAN is an LTE RAN and the first RAN is a WiFi RAN. In some embodiments the second RAN is the same RAN as the first RAN. For example both RANs may be LTE RANs. In any case the first and the second RAN may be connected to the same core network and may provide the same services.

The first RAN comprises a plurality of base stations and/or other network nodes. More specifically, the first RAN comprises a first network node 111. The first network node 111 is also referred to herein as a source network node. The first network node 111 may be a base station, such as an eNB. The base station may also be referred to as a NodeB, an evolved Node B (eNB, eNode B), a base transceiver station (BTS), Access Point Base Station, base station router, or any other network unit capable of communicating with a user equipment within a cell served by the base station depending e.g. on the radio access technology and terminology used.

The second RAN comprises a plurality of APs and/or other network nodes. More specifically, the second RAN comprises a second network node 112. The second network node 112 is also referred to herein as a rejecting network node. The second network node 112 may be a WiFi AP. The first RAN or the second RAN further comprises a third network node 113. The third network node 113 may also be referred to herein as a first available network node. The first available network node refers to a network node that is the first network node that is available to a user equipment after the user equipment has been rejected to access the rejecting network node. The third network 113 node may be the same network node as the first network node 111.

The first network node 111 serves a first cell 121, also referred to as a source cell, the second network node 112 serves a second cell 122, also referred to as a rejecting cell, and the third network node serve a third cell 123, also referred to as a first available cell. The third cell 123 may be the same cell as the first cell 121.

A cell is a geographical area where radio coverage is provided by network node equipment such as WiFi AP equipment, base station equipment at a base station site or at remote locations in Remote Radio Units (RRU). The first network node is an example of such network node equipment. The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying cells uniquely in the whole of a wireless communication network is also broadcasted in the cells. Network nodes, such as base stations and WiFi AP, communicate over the air or radio interface operating on radio frequencies with the user equipments within range of the network nodes. The user equipment transmit data over the radio interface to network nodes, such base stations and WiFi AP, in Uplink (UL) transmissions, and network nodes, such as WiFi AP and base stations, transmit data over an air or radio interface to the user equipment in Downlink (DL) transmissions.

The first network node 111 communicates with user equipments in the first cell 121, such as a user equipment 140, also referred to as a UE or a wireless device, which is to be offloaded to the second cell 122 served by the second network node 112. The offloading may for example be due to mobility of the user equipment 140.

The user equipment 140 may e.g. be a mobile terminal or a wireless terminal, a mobile phone, a computer such as e.g. a laptop, a Personal Digital Assistants (PDAs) or a tablet computer, sometimes referred to as a surf plate, with wireless capability, or any other radio network units capable to communicate over a radio link in a wireless communications network. Please note the term user equipment used in this document also covers other wireless devices such as Machine to machine (M2M) devices, even though they do not have any user.

Some or all of the network nodes may communicate with an operation and maintenance (OAM) system 150.

Figure 11B:
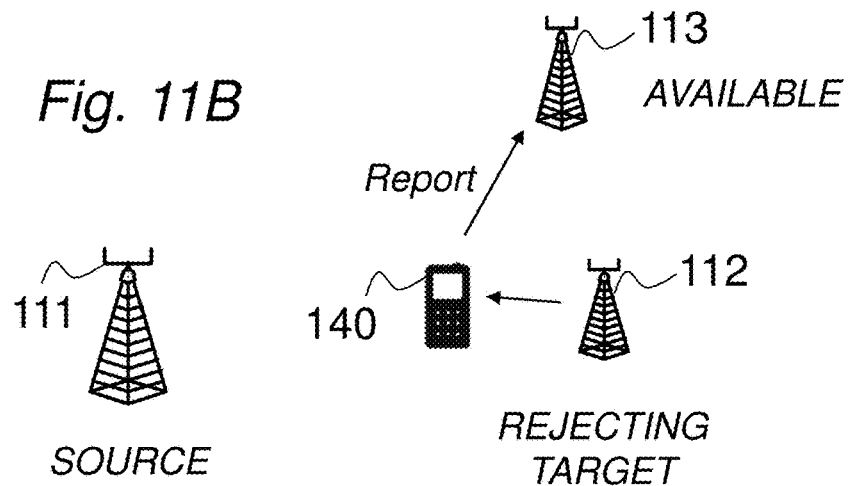
FIG. 11B-D are schematic diagrams illustrating examples of different scenarios for the signaling of the report indicating failure to access the rejecting cell due to internal reasons of the rejecting network node.
Figure 11C:
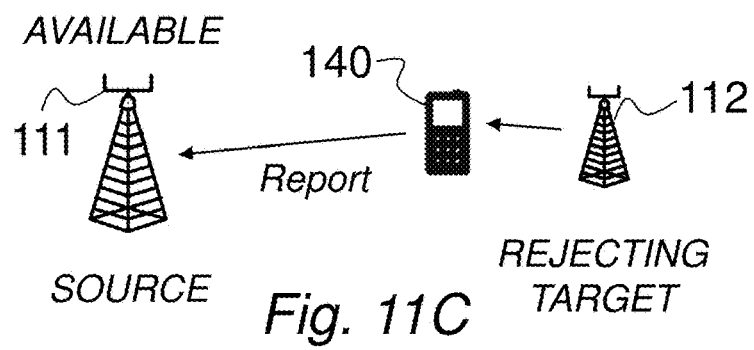

FIG. 11B-C are schematic diagrams illustrating examples of different scenarios for the signaling of the report indicating failure to access the rejecting cell due to internal reasons of the rejecting network node.

In the example of FIG. 11B, the failure report is sent from the UE 140 to the available network node 113 serving an available cell.

In the example of FIG. 11C, the failure report is sent from the UE 140 directly to the source network node 111, which happens to serve an available cell.

Figure 11D:
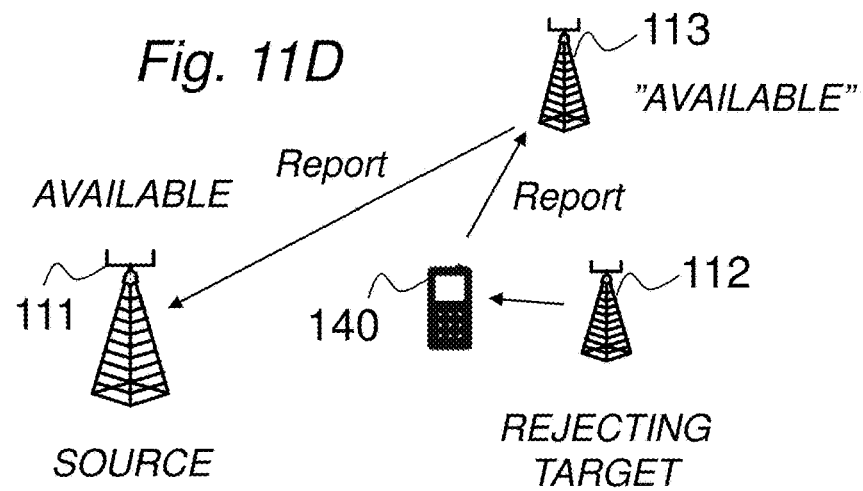

In the example of FIG. 11D, the failure report is first sent from the UE 140 to the available network node 113 serving an available cell, and then forwarded from the network node 113 to the source network node 111 also serving an available cell. In this example, the failure report is sent from the UE 140 to the source network node 111 via the network node 113.

More specifically the following are embodiments related to the user equipment 140 and the network node 111, the network node 112, and the network node 113:

The user equipment 140 embodiments relate to FIGS. 12, 16, 18 and 19. The first network node 111 embodiments relate to FIGS. 13, 17, 18 and 20. The second network node 112 embodiments relate to FIGS. 17 and 18, and the third network node 113 embodiments relate to FIGS. 17, 18 and 20.

By way of example, a method in the user equipment 140 for enabling steering of access of user equipments between the third cell 123 and neighbouring cells, such as the second cell 122 is provided. The method may comprise any one or more actions out of:

Receiving 1201 an indication of rejection to access the second cell 122 due to internal reasons to the second network node 112. The indication of rejection may comprise an indication of a cause of rejection. This action may be performed by means such as a receiving module in the user equipment 140. The means may further be represented by a wireless receiver in the user equipment 140.

Sending 1202 to the third network node 113, which may be the first available network node, a report indicating failure to access the second cell 122 due to internal reasons to the second network node 112. The report comprises information about the failure. This action may be performed by means such as a sending module in the user equipment 140. The means may further be represented by wireless transmitter in the user equipment 140.

By way of example, a method in the first network node 11 or third network node 113 for steering of access of user equipments between the third cell 123 and neighbouring cells, such as the second network node 112, is provided. The method may comprise any one or more actions out of:

Receiving 1301 a report from the user equipment 140, which report indicates failure to access the second cell 122 due to internal reasons to the second network node 112. The report comprises information about the failure. This action may be performed by means such as a receiving module in the third network node 113. The means may further be represented by a wireless receiver in the third network node 113. The report may comprise the information given above in relation to the method in the user equipment 140.

Steering the access of UEs between the third cell 123 and neighbouring cells, such as the second cell 122, by modifying 1302 an offloading parameter and/or threshold in the offload policy to the neighbouring cells, such as the second cell 122. This action may be performed by means such as a modifying module in the third network node 113. The modifying means may further be represented by a processor and a memory in the third network node 113. In some embodiments the third network node 113 may forward the report to the first network node 111 or any other neighbouring network node. The forwarding may be performed by means such as a forwarding module in the user equipment. The forwarding means may further be represented by a wireless transmitter in the third network node 113. As mentioned above the third network node 113 may be the same network node as the first network node 111.

In the following embodiments the first network node 111 will be a 3GPP network node and the second network node 112, i.e. the target network node, will be a WiFi AP if nothing else is stated.

The report sent to third network node 113 mentioned above may comprise the following:

a) Latest measurements of serving source cell, collected before the offload to the target cell, served by the WiFi AP and latest measurements of neighbour WiFi APs and other available neighbor cells belonging to the same or different RATs. This information helps evaluating whether there are other suitable offloading cells besides the target WiFi AP.

b) Identity of the WiFi AP target cell, e.g., BSSID, ESSID, HESSID, where the rejection was experienced. This information helps understanding the identity of the WiFi AP target cell where the access failed.

c) Identity of the source cell serving the UE before the offload to the target WiFi AP occurred. This cell may be related to any serving technology. This information is used to identify the network node hosting the cell from which the offload was originated. This network node may eventually need to adjust its WiFi offload policies in order to minimise similar future failures.

d) Identity of the WiFi AP cell, e.g., BSSID, ESSID, HESSID where the UE possibly re-established connection after having been rejected by the target WiFi AP or by any other target cell. This cell is the third cell mentioned above. This information, together with the neighbour cells measurements, helps the source node adjust its offloading policy. For example a new optimised policy may imply offloading to the re-establishment WiFi AP cell or other cell, rather than the original target WiFi AP or any other target.

e) Time from the occurrence of the rejection in the target cell, e.g. WiFi AP, to the time the failure report is signalled from UE to the access network:
This information is useful to evaluate the "age" of the failure report. This allows for example to discard the failure event from the failure statistics used to determine failure resolution measures, in case such measures (or measures altering the failure conditions) have been already implemented before the report was sent by the UE.

f) Bearer identifiers for the bearers supported by the UE before the offload to the target cell (e.g. WiFi AP) was carried out. This information could consist of e.g. E-RAB IDs, in the case the serving RAT before the offload was LTE and in case information about the E-RABs supported by the UE are still kept at the time the failure report is received. In addition or alternatively, this information could consist of parameters indicating the QoS and priority of bearers used by the UE before the offload occurred. For example, in LTE such per-bearer parameters could be the QoS Class Identifier (QCI) and the Allocation and Retention Priority (ARP). This information helps the source node to optimize future offloading towards the failure target (e.g. WiFi target AP) also depending on the bearers used by the served UEs. For example, if failures at the target WiFi AP are recorded mostly for bandwidth heavy bearers e.g. used for streaming video services, then the source node could decide to offload permanently or for a given time window all UEs using such bearers to a different target such as a different WiFi AP or other RAT cell.

g) Cause for rejection in target cell (e.g. WiFi AP). It has to be noted that the failure in question here is a failure occurring not because of radio reasons, i.e. the failure is not due to e.g. channel conditions or lack of successful reception or delivery of radio signals. Rather the rejection in question here is due to reasons internal to the target node, e.g. high traffic demand. For this reason this new information is completely new to the concept of RLF Report present in MRO and may also be applied to the case where the target is an LTE cell or any other RAT target cell supporting such technology. This information may include one or more different causes, for example possible cause values reported could indicate:

i) Overload, or in general rejection reasons depending on load in the WiFi AP ii) Not supported bearer/service type, or in general a rejection cause indicating that the data service requested by the UE cannot be provided by the WiFi AP iii) Outage, or in general rejection causes for which the WiFi AP is functioning from a radio point of view but it is not able to send or receive data traffic to the rest of the network iv) Transport network failure, or in general rejection causes due to issues on the transport network connecting the WiFi AP to the rest of the system v) UE not allowed in the target cell, or in general rejection causes due to the fact the UE cannot be admitted to the WiFi AP vi) The cause could also be specified by an operator-configured arbitrary value that is provided at the time of rejection. The value does not necessarily relate to a reason that the UE may interpret and could vary between different deployments.

It should be pointed out that the information above may either be provided in a separate new report or may be enhancements to the existing RLF Report. In any case, such report may be signalled by the UE to the first available radio access network supporting reception of this information.

In some of the embodiments, once the failure report is available at the UE, the UE may signal availability of such report to the first suitable radio access network accessed. For example, in case the only radio access network able to retrieve such report is LTE, the UE will signal availability of such report as soon as entering an LTE cell. Such signaling may happen either upon request from the LTE network of whether a failure report is available or autonomously by the UE.

In some other embodiment, once the failure report is signalled from the UE to the first suitable and available radio access network the node receiving the report may forward the failure report to the source node, i.e. to the node serving the UE before the offload to the target WiFi AP occurred. This may be achieved by means of the "Identity of the cell serving the UE before the offload to the target WiFi AP occurred" contained in the failure report. Such signaling may occur via a new dedicated message over available interfaces. Alternatively, in the example where the report is signalled to an LTE eNB and where the source cell is an LTE cell in a different eNB, this signaling may occur by reusing the X2 RLF INDICATION message.

One possible description of this embodiment is the case where the failure report may be reported to a WiFi access point supporting reception of such report and where the source cell serving the UE before offloading to the failure cell occurred is an LTE cell.

Figure 14:
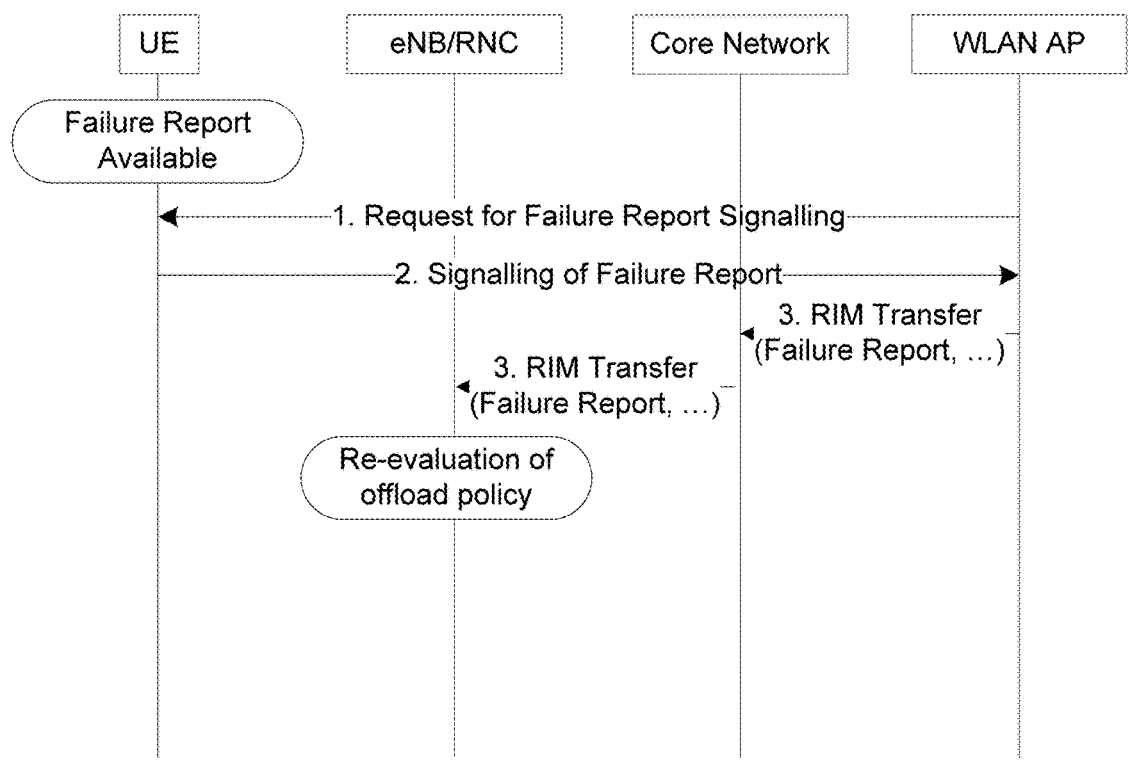
FIG. 14 is a schematic signaling diagram illustrating an example of how a WLAN access point receiving a failure report may forward the report as part of a RIM message to a source network node.

In this case the WiFi AP may forward the failure report as part of a RAN Information Management (RIM) protocol message to the source LTE eNB. The IE used in a RIM message to the eNB may be new and could for example include the failure report together with other information such as source cell before offload occurred, target cell of the offload, type of offload (e.g. offload for radio reasons, offload due to load balancing). Alternatively an existing IE with the information described for the new IE (some, or all or more of them) may be reused, for example the HO Report IE as described in [14]. FIG. 14 gives an example of how this signaling may work.

The network node receiving the failure report from another RAN node via inter node interface signaling may use the information in the report to build statistics on failure events and to modify offloading policies to neighbour WiFi APs. For example, if the cause of rejection reported by the UE is due to load reasons, one possible adjustment would be that the source node could avoid offloading UEs to the target WiFi AP for a specific time window.

Additionally, if the failure is due to load reasons and most of the failures are for UEs using specific services, the source node could avoid offloading to the target WiFi AP future UEs on similar services for a given time window.

Additionally, with the help of neighbor cell measurements information reported in the report, the source node could decide to select another suitable WiFi or other RAT target cell for the UEs that should not be offloaded to the target WiFi AP. Also, if the cause of rejection is UE not allowed in this cell, the source node could avoid offloading the same UE to the target WiFi AP for a given time window. Further, if the rejection cause indicates failure due to transport network issues, the source node may avoid offloading UEs to that WiFi AP for a certain time window or until further configuration allows the offload again.

In some other embodiments, the failure statistics collected by the node receiving the failure report are reported to an operation and maintenance (OAM) system, which may use such statistics to optimize network configuration. For example neighbor relationships and offloading policies may be coordinated by such OAM system depending on the information collected from each failure event.

Figure 15:
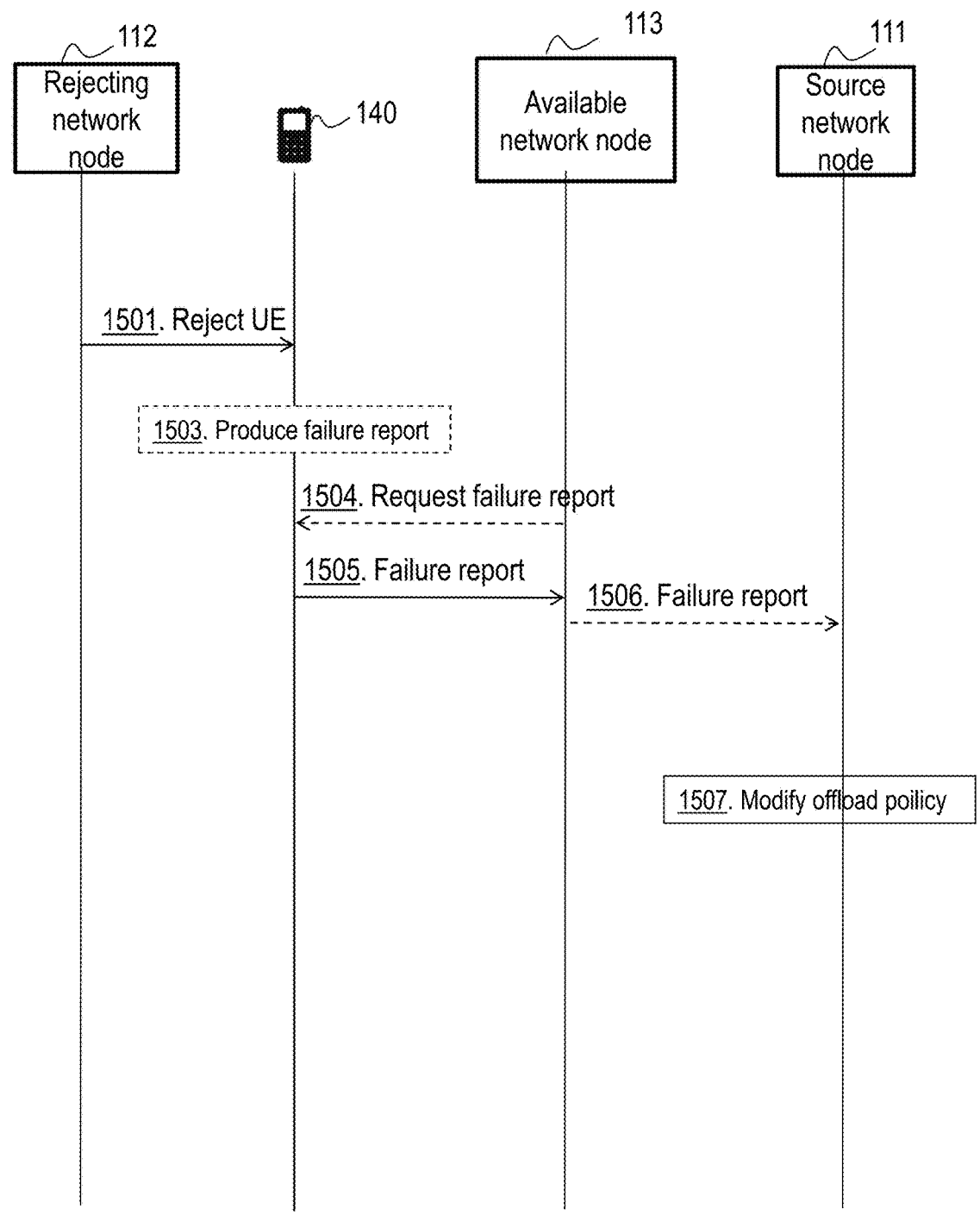
FIG. 15 is a schematic diagram illustrating an example of signaling and actions for enabling steering of access of user equipment(s) between cells.

FIG. 15 is a combined signalling diagram and flow chart that describes actions that take place to steer access of user equipments between the third cell 123 and neighbouring network nodes.

In action 1501, the rejecting network node 112 rejects the UE 140, and may send an indication of rejection.

In action 1503, the UE 140 produces a corresponding failure report.

In action 1504, the available network node 113 may optionally request the failure report.

In action 1505, the UE sends the failure report to the available network node 113.

In action 1506, the network node 113 may optionally send the failure report to the source network node 111.

In action 1507, the network node 113 and/or the source network node 111, if the report was sent there, may modify the offload policy, i.e. at least one offloading parameter thereof.

In general, it will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

As used herein, the non-limiting terms "User Equipment" and "wireless device" may refer to a mobile phone, a cellular phone, a Personal Digital Assistant, PDA, equipped with radio communication capabilities, a smart phone, a laptop or Personal Computer, PC, equipped with an internal or external mobile broadband modem, a tablet PC with radio communication capabilities, a target device, a device to device UE, a machine type UE or UE capable of machine to machine communication, iPAD, customer premises equipment, CPE, laptop embedded equipment, LEE, laptop mounted equipment, LME, USB dongle, a portable electronic radio communication device, a sensor device equipped with radio communication capabilities or the like. In particular, the term "UE" and the term "wireless device" should be interpreted as non-limiting terms comprising any type of wireless device communicating with a radio network node in a cellular or mobile communication system or any device equipped with radio circuitry for wireless communication according to any relevant standard for communication within a cellular or mobile communication system.

As used herein, the non-limiting term "network node" may refer to base stations, access points, network control nodes such as network controllers, radio network controllers, base station controllers, access controllers and the like. In particular, the term "base station" may encompass different types of radio base stations including standardized base stations such as Node Bs, or evolved Node Bs, eNBs, and also macro/micro/pico radio base stations, home base stations, also known as femto base stations, relay nodes, repeaters, radio access points, base transceiver stations, BTSs, and even radio control nodes controlling one or more Remote Radio Units, RRUs, or the like.

According to an aspect, the proposed technology provides a user equipment configured to enable steering of access between cells. The user equipment is configured to receive an indication of rejection to access a cell, also referred to as a rejecting cell, due to internal reasons, independent of radio channel conditions, of a network node serving the rejecting cell. The user equipment is also configured to send to another network node serving an available cell, different from the rejecting cell, a report indicating failure to access the rejecting cell due to internal reasons, independent of radio channel conditions, of the network node serving the rejecting cell.

By way of example, the user equipment is configured to send the report indicating failure to access the rejecting cell to enable modifying at least one offloading parameter and/or threshold used for steering of access of the user equipment between the available cell and neighbouring cell(s) based on the report.

In a particular example, the user equipment is configured to operate in connection with offloading from a source cell to a target cell, wherein the rejecting cell is a rejecting target cell. The source cell and the target cell may belong to the same radio access network, or the source cell and the target cell may belong to different radio access networks.

For example, the source cell and the target cell may belong to different radio access networks of different radio access technologies.

As an example, one radio access network is a cellular radio access network and another radio access network is a Wireless Local Area Network, WLAN.

In a particular example, the cellular radio access network may be a 3rd Generation Partnership Project, 3GPP, cellular radio access network.

By way of example, the user equipment is configured to receive the indication as an indication of a rejection that is due to load conditions in the network node serving the rejecting cell.

Figure 16:
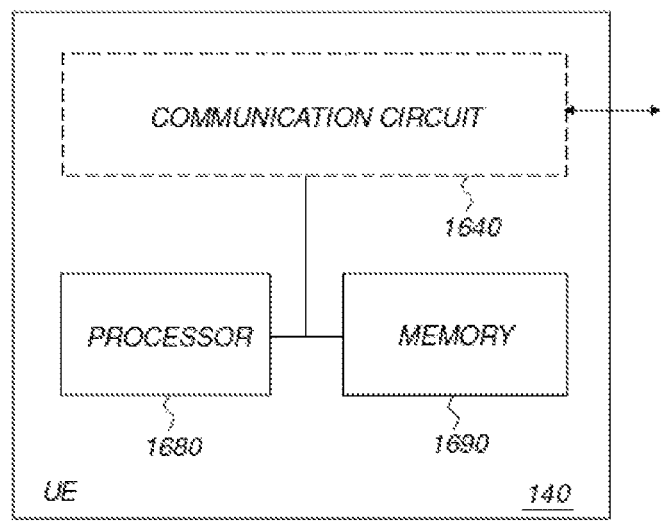
FIG. 16 is a schematic block diagram illustrating an example of a user equipment according to an embodiment.
Figure 19:
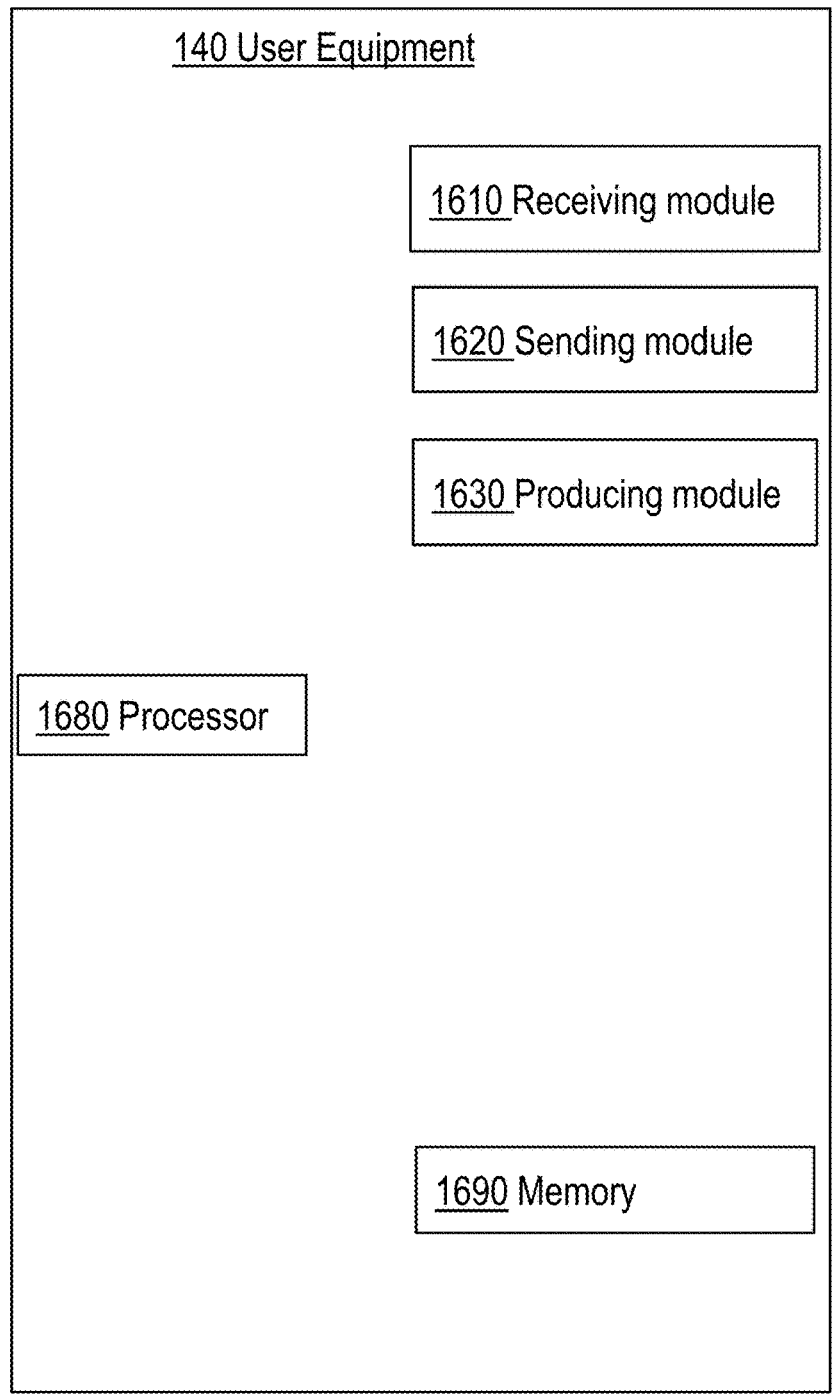
FIG. 19 is a schematic block diagram illustrating an example of a user equipment according to a complementary embodiment.

In a particular example implementation, as illustrated in FIG. 16 and/or FIG. 19, the user equipment, UE, 140 comprises at least one processor 1680 and a memory 1690, wherein the memory comprises instructions, which when executed on at least one processor cause the at least one processor to enable the steering of access between cells.

Optionally, the user equipment, UE, 140 may also include communication circuitry. In the example of FIG. 16, the optional communication circuit 1640 may include functions for wired and/or wireless communication with other devices and/or network nodes in the network. In a particular example, the UE may include radio circuitry for communication with one or more other nodes, including transmitting and/or receiving information. The communication circuit 1640 may be interconnected to the processor 1680 and/or memory 1690. In the example of FIG. 19, the communication circuitry may be for example the receiving module 1610 and the sending module 1620.

According to another aspect, the proposed technology also provides a network node configured to steer access between cells. The network node is configured to receive, from user equipment, a report indicating failure to access a cell, also referred to as a rejecting cell, due to internal reasons, independent of radio channel conditions, of another network node, also referred to as a rejecting network node, serving the rejecting cell. The network node is also configured to modify at least one offloading parameter and/or threshold used for steering the access of the user equipment between cells based on the report indicating failure to access the rejecting cell due to internal reasons of the rejecting network node serving the rejecting cell.

By way of example, the network node is configured to steer the access of the user equipment between a cell served by the network node and neighbouring cell(s), and the network node is configured to modify an offloading parameter and/or threshold in the offload policy to the neighbouring cell(s).

In an optional embodiment, the network node is configured to steer the access of the user equipment between cells by steering traffic between radio access networks.

In a particular example, the network node is configured to operate in connection with offloading from a source cell to a target cell, wherein the rejecting cell is a rejecting target cell. The source cell and the target cell may belong to the same radio access network, or the source cell and the target cell may belong to different radio access networks.

For example, the source cell and the target cell may belong to different radio access networks of different radio access technologies.

In a particular example, a first radio access network is a cellular radio access network and a second radio access network is a Wireless Local Area Network, WLAN.

As an example, the cellular radio access network may be a 3rd Generation Partnership Project, 3GPP, cellular radio access network.

In an optional embodiment, the network node is configured to steer the access of the user equipment between cells by avoiding offloading to the rejecting cell for a specific time window or avoiding offloading to the rejecting cell on specific services for a specific time window.

By way of example, the network node may be configured to receive a report indicating a failure that is due to load conditions in the network node serving the rejecting cell.

As an example, the network node is a network node that is available to the user equipment after the user equipment has been rejected to access the rejecting cell served by the rejecting network node.

In an optional embodiment, the network node is different from a source network node hosting a source cell from which offload towards the rejecting cell was originated.

In another optional embodiment, the network node is a source network node hosting a source cell from which offload towards the rejecting cell was originated.

Figure 17:
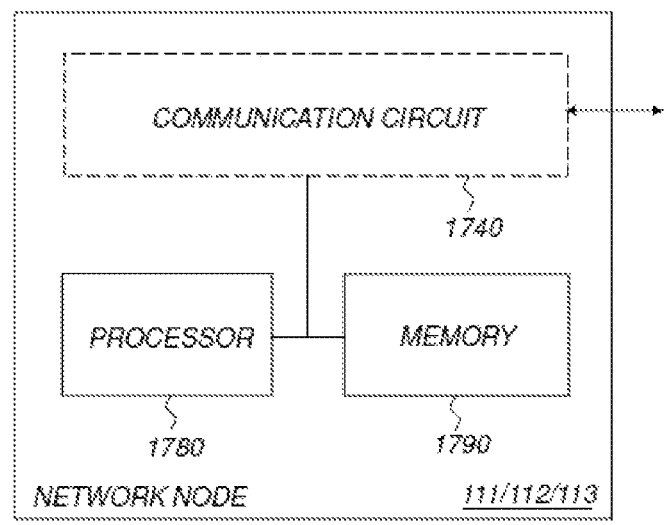
FIG. 17 is a schematic block diagram illustrating an example of a network node according to an embodiment.
Figure 20:
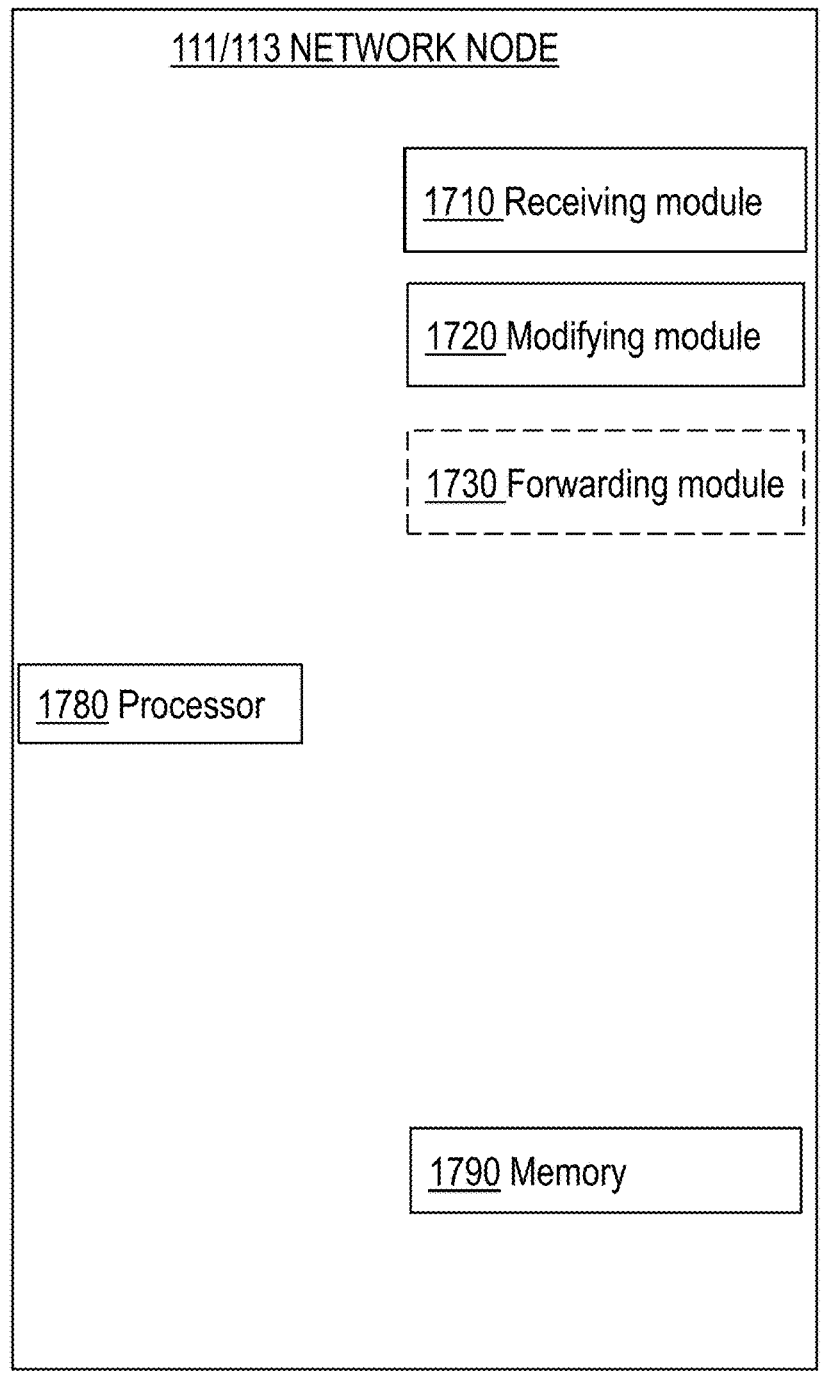
FIG. 20 is a schematic block diagram illustrating an example of a network node according to a complementary embodiment.

In a particular example implementation, as illustrated in FIG. 17 and/or FIG. 20, the network node 111; 113 comprises at least one processor 1780 and a memory 1790, wherein the memory comprises instructions, which when executed on at least one processor cause the at least one processor to steer the access between cells.

Optionally, the network node 111; 112; 113 may also include communication circuitry. In the example of FIG. 17, the optional communication circuit 1740 may include functions for wired and/or wireless communication with other devices and/or network nodes in the network. In a particular example, the network node may include radio circuitry for communication with one or more other nodes, including transmitting and/or receiving information. The communication circuit 1740 may be interconnected to the processor 1780 and/or memory 1790. In the example of FIG. 20, the communication circuitry may be for example the receiving module 1710 and/or the optional forwarding module 1730.

By way of example, the network node may be a base station and/or an access point.

According to yet another aspect, the proposed technology also provides yet another network node configured for operation in a radio access network. This network node may for example be represented by the rejecting network node 112. The network node is configured to reject a user equipment access to a cell, also referred to as a rejecting cell, due to internal reasons, independent of radio channel conditions, of the network node. The network node is further configured to send to the user equipment an indication of rejection to access the rejecting cell due to internal reasons, independent of radio channel conditions, of the network node.

In particular examples, at least some of the steps, functions, procedures, modules and/or blocks described herein are thus implemented in a computer program, which is loaded into the memory for execution by processing circuitry including one or more processors. The processor(s) and memory are interconnected to each other to enable normal software execution. An optional input/output device may also be interconnected to the processor(s) and/or the memory to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

Figure 18:
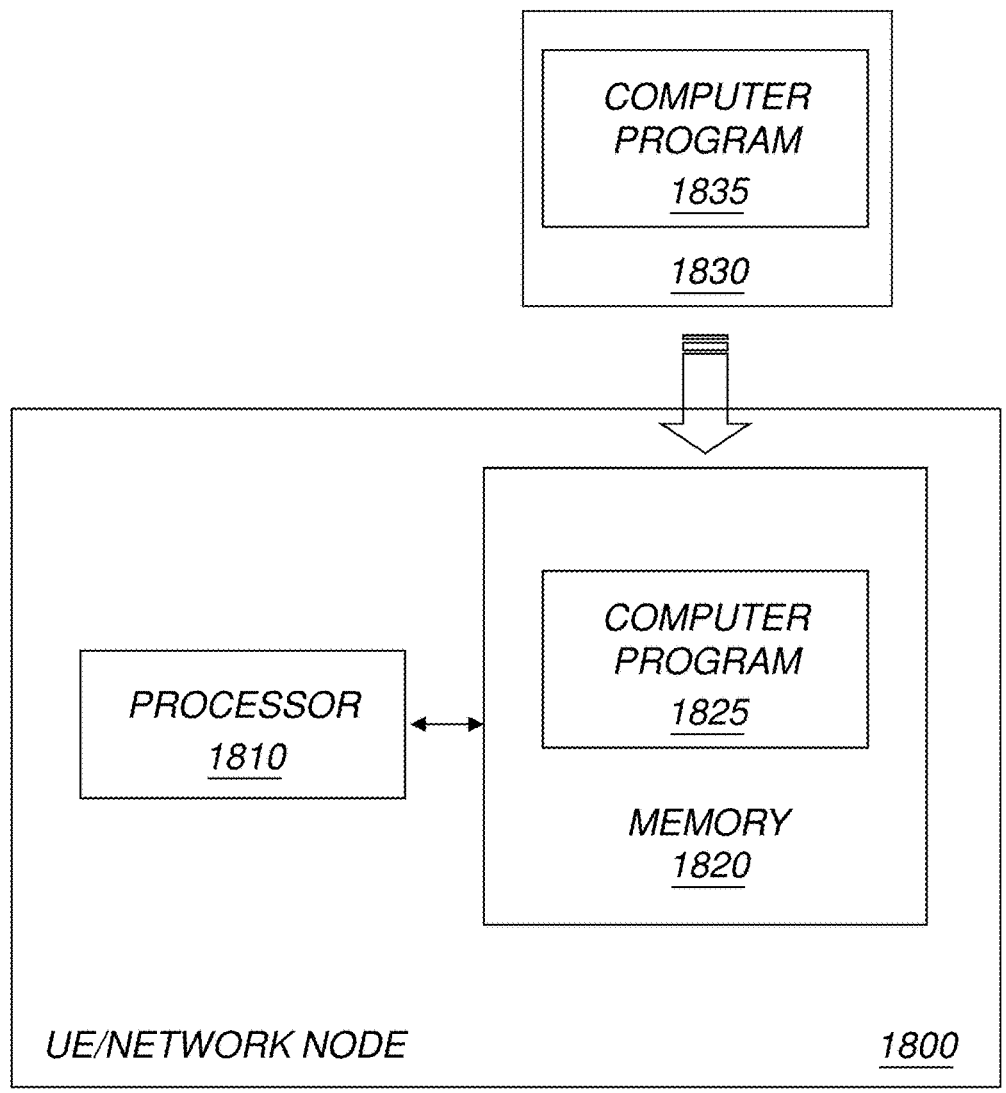
FIG. 18 is a schematic diagram illustrating an example of a computer implementation according to an embodiment.

FIG. 18 is a schematic diagram illustrating an example of a computer implementation according to an embodiment. This implementation is complementary to the examples illustrated in FIGS. 16, 17, 19 and 20.

In a particular example embodiment, there is a computer program 1825; 1835 comprising instructions, which when executed by at least one processor 1680; 1810, cause the at least one processor to:

receive an indication of rejection to access a cell, also referred to as a rejecting cell, due to internal reasons, independent of radio channel conditions, of a network node serving the rejecting cell; and send a report, for another network node serving an available cell, different from the rejecting cell, wherein the report indicates failure to access the rejecting cell due to internal reasons, independent of radio channel conditions, of the network node serving the rejecting cell.

In another particular example embodiment, there is provided a computer program 1825; 1835 comprising instructions, which when executed by at least one processor 1780; 1810, cause the at least one processor to:

receive a report, originating from user equipment, indicating failure to access a cell, also referred to as a rejecting cell, due to internal reasons, independent of radio channel conditions, of another network node, also referred to as a rejecting network node, serving the rejecting cell; and modify at least one offloading parameter and/or threshold used for steering the access of the user equipment between cells based on the report indicating failure to access the rejecting cell due to internal reasons of the rejecting network node serving the rejecting cell.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

In particular, there is provided a computer program product 1690; 1790; 1820; 1830 comprising a computer-readable storage medium having stored thereon any one of the computer programs described above.

By way of example, the software or computer program may be realized as a computer program product, which is normally carried or stored on a computer-readable medium, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding user equipment and/or network node may then be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Embodiments herein may be performed in the user equipment 140. The user equipment 140 may comprise the following modules depicted in FIG. 19 for enabling steering of access of user equipments between the third network node 113 and neighbouring network nodes, such as the second network node 112: a receiving module 1610, a sending module 1620 and a producing module 1630. The producing module 1630 is configured to produce the failure report.

In a particular example, the user equipment 140 comprises:
  a receiving module 1610 for receiving an indication of rejection to access a cell, also referred to as a rejecting cell, due to internal reasons, independent of radio channel conditions, of a network node serving the rejecting cell; and
  a producing module 1630 for producing a report indicating failure to access the rejecting cell due to internal reasons, independent of radio channel conditions, of the network node serving the rejecting cell;
  a sending module 1620 for sending the report indicating failure to access the rejecting cell to another network node serving an available cell, different from the rejecting cell.

Embodiments herein may be performed in the third network 113, and/or the first network node 111 as previously indicated. The third network node 111/113 may comprise the following modules depicted in FIG. 20 for steering of access of user equipments between the third network node 113 and neighbouring network nodes, such as the second network node 112: a receiving module 1710, a modifying module 1720 and an optional forwarding module 1730. The forwarding module 1730 may be configured to report the failure report to another network node, such as the first network node 111 or an operations and maintenance node.

In a particular example, the network node 111; 113 comprises:
  a receiving module 1710 for receiving a report, originating from user equipment, indicating failure to access a cell, also referred to as a rejecting cell, due to internal reasons, independent of radio channel conditions, of another network node, also referred to as a rejecting network node, serving the rejecting cell; and
  a modifying module 1720 for modifying at least one offloading parameter and/or threshold used for steering the access of the user equipment between cells of different network nodes based on the report indicating failure to access the rejecting cell due to internal reasons of the rejecting network node serving the rejecting cell.

Alternatively, it is possibly to realize the modules in FIG. 19 and FIG. 20 predominantly by hardware modules, or alternatively by hardware. The extent of software versus hardware is purely implementation selection.

As mentioned, the embodiments herein may be implemented through one or more processors, such as a processor 1680 in the user equipment 140 depicted in FIG. 19, and a processor 1780 in the third network node 113 depicted in FIG. 20, together with computer program code for performing the functions and actions of the embodiments herein. The program code mentioned above may also be provided as a computer program product, for instance in the form of a data carrier carrying computer program code for performing the embodiments herein when being loaded into the in the user equipment 140 or the third network node 113. One such carrier may be in the form of a CD ROM disc. It is however feasible with other data carriers such as a memory stick. The computer program code may furthermore be provided as pure program code on a server and downloaded to the user equipment 140 or the third network node 113.

Thus, the methods according to the embodiments described herein for the user equipment 140 and the third network node 113 may respectively be implemented by means of a computer program product, comprising instructions, i.e., software code portions, which, when executed on at least one processor, cause the at least one processor to carry out the actions described herein, as performed by the user equipment 140 and the third network node 113. The computer program product may be stored on a computer-readable storage medium. The computer-readable storage medium, having stored there on the computer program, may comprise the instructions which, when executed on at least one processor, cause the at least one processor to carry out the actions described herein, as performed by the user equipment 140 and the third network node 113. In some embodiments, the computer-readable storage medium may be a non-transitory computer-readable storage medium.

The user equipment 140 and the third network node 113 may further each comprise a memory 1690, 1790 comprising one or more memory units. The memory 1690, 1790 is arranged to be used to store obtained information, store data, configurations, schedulings, and applications etc. to perform the methods herein when being executed in the user equipment 140 or the third network node 113.

Those skilled in the art will also appreciate that the different modules described above may refer to a combination of analog and digital circuits, and/or one or more processors configured with software and/or firmware, e.g. stored in the memory, that when executed by the one or more processors such as the processors in the user equipment 140 and the third network node 113 perform as described above.

One or more of these processors, as well as the other digital hardware, may be included in a single application-specific integrated circuitry (ASIC), or several processors and various digital hardware may be distributed among several separate components, whether individually packaged or assembled into a system-on-a-chip (SoC).

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

REFERENCES

[1] 3GPP TS 23.402, V12.3.0, Architecture enhancements for non-3GPP accesses.
[2] 3GPP TR 23.852, V12.0.0, Study on S2a Mobility based on GTP & WLAN access to EPC (SaMOG).
[3] 3GPP TS 24.312, V12.3.0, Access Network Discovery and Selection Function (ANDSF) Management Object (MO).
[4] 3GPP TS 24.302, V12.3.0, Access to the 3GPP Evolved Packet Core (EPC) via non-3GPP access networks; Stage 3.
[5] 3GPP TR 23.865, V12.1.0, Study on Wireless Local Area Network (WLAN) network selection for 3GPP terminals; Stage 2.
[6] RP-122038—New Study Item Proposal on WLAN/3GPP Radio Interworking, Intel Corporation.
[7] 3GPP TR 37.834, V2.0.0: WLAN/3GPP Radio Interworking.
[8] 3GPP TS 25.304, V12.0.0, User Equipment procedures in idle mode and procedures for cell reselection in connected mode.
[9] 3GPP TS 36.304, (E-UTRA), V11.6.0: User Equipment procedures in idle mode.
[10] 3GPP TS 25.331, V12.0.0, Radio Resource Control (RRC); Protocol specification.
[11] 3GPP TS 36.331, (E-UTRA), V11.6.0; Radio Resource Control (RRC); Protocol specification.
[12] 3GPP RP-132101, New Work Item Proposal on WLAN/3GPP Radio Interworking.
[13] R3-120390, "IRAT MRO way forward", Huawei, RAN3 #75.
[14] 3GPP TS 36.413, (E-UTRAN) V12.0.0; S1 Application Protocol (S1AP); Protocol Specifications.
[15] WO 2012/019363
[16] WO 2013/091161
[17] EP 2 720 508
[18] 4G Americas, "Self-Optimizing Networks in 3GPP Release 11: The Benefits of SON in LTE; October 2013.
[19] R3-102713, "IRAT too late", Huawei, RAN WG3 #69bis.

What is claimed is:

1. A method performed by a user equipment configured for operation in a first type of Radio Access Networks (RANs) that are based on a first Radio Access Technology (RAT) and in a second type of RANs that are based on a second RAT, the method comprising:
   releasing a connection from a first RAN of the first type, in conjunction with offloading from the first RAN;
   later detecting a cell in a second RAN of the second type that satisfies one or more signal quality criteria and attempting access towards the cell as a target cell to be used for connecting to the second RAN;
   receiving an access rejection indication from the target cell, indicating that the attempted access was rejected for a reason that is independent of radio conditions between the target cell and user equipment; and
   enabling modification of one or more offloading parameters in the first RAN by, upon successfully connecting to another cell in the first or second RAN, sending a report for delivery to one or more base stations in the first RAN, the report indicating that the reason the attempted access by the user equipment towards the target cell in the second RAN was rejected was independent of the radio conditions between the target cell and the user equipment.

2. The method of claim 1, wherein the first RAN is a cellular radio access network and the second RAN is a Wireless Local Area Network, WLAN.

3. The method of claim 2, wherein the cellular radio access network is a 3rd Generation Partnership Project, 3GPP, cellular radio access network.

4. The method of claim 1, wherein the access rejection indication indicates that the attempted access was rejected because of load conditions in the target cell.

5. The method of claim 1, wherein the report indicates the reason that the attempted access was rejected.

6. The method of claim 5, wherein the access rejection indication indicates at least one of the following:
   access rejection because of loading in the target cell;
   access rejection because of an unsupported bearer or service type;
   access rejection because a data service requested by the user terminal cannot be provided via the target cell;
   access rejection because of an outage or transport network failure affecting the target cell;
   access rejection because the user equipment is disallowed from connecting to the target cell or could not be admitted to the target cell; and
   access rejection based on a reason indicated by an operator-configured value returned as the access rejection indication.

7. The method of claim 1, wherein the method further comprises the user equipment including at least one of the following in the report:
   latest measurements collected by the user equipment for at least a then-serving cell in the first RAN, before offloading from the first RAN;
   identity of the target cell;
   identity of source cell serving the user equipment before offload to target cell;
   identity of the cell where the user equipment re-established connection after having been rejected by the target cell;
   time from occurrence of the rejection to the time the failure report is signalled from the user equipment; and
   bearer identifiers for bearers supported before offload to target cell.

8. A method performed by a network node configured for operation in a first Radio Access Network (RAN) based on a first Radio Access Technology (RAT), the method comprising:
   offloading one or more user equipments from a first cell in the first RAN in accordance with one or more offloading parameters reflecting an offloading policy used for offloading user equipments from at least the first cell, each such user equipment being referred to as an offloaded user equipment;

determining that the one or more offloaded user equipments were later refused access in a second cell in a second RAN based on a RAT different than the first RAT, for reasons independent of radio conditions between the second cell and respective ones of the one or more offloaded user equipments, said determining based on receiving one or more reports indicating the refused accesses; and adjusting the one or more offloading parameters to reduce or prevent offloading from the first cell of the first RAN towards the second cell of the second RAN.

9. The method of claim 8, wherein the first RAN is a cellular radio access network and the second RAN is a Wireless Local Area Network, WLAN.

10. The method of claim 9, wherein the cellular radio access network is a 3rd Generation Partnership Project, 3GPP, cellular radio access network.

11. The method of claim 8, wherein adjusting the one or more offloading parameters comprises avoiding offloading to the second cell for a specific time window or avoiding offloading to the second cell on specific services for a specific time window.

12. The method of claim 8, wherein the one or more reports indicate that the one or more offloaded user equipments were refused access because of loading in the second cell.

13. A user equipment configured for operation in a first type of Radio Access Networks (RANs) that are based on a first Radio Access Technology (RAT) and in a second type of RANs that are based on a second RAT, the user equipment comprising:

transceiver circuitry configured for communicating with radio network nodes in RANs of the first type and with radio network nodes in RANs of the second type; and processing circuitry operatively associated with the transceiver circuitry and configured to:

release a connection from a first RAN of the first type, in conjunction with offloading from the first RAN;

subsequently detect a cell in a second RAN of the second type that satisfies one or more signal quality criteria and attempting access towards the cell as a target cell to be used for connecting to the second RAN;

receive an access rejection indication from the target cell, indicating that the attempted access was rejected for a reason that is independent of radio conditions between the target cell and user equipment; and enable modification of one or more offloading parameters in the first RAN by, upon successfully connecting to another cell in the first or second RAN, sending a report for delivery to one or more base stations in the first RAN, the report indicating that the reason the attempted access by the user equipment towards the target cell in the second RAN was rejected was independent of the radio conditions between the target cell and the user equipment.

14. A network node configured for operation in a first Radio Access Network (RAN) based on a first Radio Access Technology (RAT), the network node comprising:

communication circuitry configured for at least one of: communicating with user equipments in one or more cells of the first RAN, and communicating with one or more other network nodes in the first RAN or in a core network associated with the first RAN; and processing circuitry operatively associated with the communication circuitry and configured to:

offload one or more user equipments from a first cell in the first RAN in accordance with one or more offloading parameters reflecting an offloading policy used for offloading user equipments from at least the first cell, each such user equipment being referred to as an offloaded user equipment;

determine that the one or more offloaded user equipments were later refused access in a second cell in a second RAN based on a RAT different than the first RAT, for reasons independent of radio conditions between the second cell and respective ones of the one or more offloaded user equipments, the determining operation based on receiving one or more reports indicating the refused accesses; and adjust the one or more offloading parameters to reduce or prevent offloading from the first cell of the first RAN towards the second cell of the second RAN.

\* \* \* \* \*

UNITED STATES PATENT AND TRADEMARK OFFICE
CERTIFICATE OF CORRECTION

PATENT NO. : 10,321,382 B2
APPLICATION NO. : 15/462479
DATED : June 11, 2019
INVENTOR(S) : Teyeb et al.

It is certified that error appears in the above-identified patent and that said Letters Patent is hereby corrected as shown below:

On the Title Page

In Item (71), under "Applicant", in Column 1, Line 2, delete "Stockholm OT (SE)" and insert -- Stockholm (SE) --, therefor.

In Item (63), under "Related U.S. Application Data", in Column 1, Line 1, delete "14/408,479," and insert -- 14/408,479, now abandoned, --, therefor.

In the Specification

In Column 1, Line 7, delete "2014," and insert -- 2014, now abandoned, --, therefor.

Signed and Sealed this
Fifteenth Day of October, 2019

Andrei Iancu
*Director of the United States Patent and Trademark Office*